(12) United States Patent
Yukumoto et al.

(10) Patent No.: US 9,191,419 B2
(45) Date of Patent: Nov. 17, 2015

(54) INFORMATION PROCESSING SYSTEM, INFORMATION PROCESSING DEVICE

(71) Applicants: Reiji Yukumoto, Kanagawa (JP); Hidekuni Annaka, Saitama (JP); Yoko Sugiura, Kanagawa (JP); Aritaka Hagiwara, Kanagawa (JP)

(72) Inventors: Reiji Yukumoto, Kanagawa (JP); Hidekuni Annaka, Saitama (JP); Yoko Sugiura, Kanagawa (JP); Aritaka Hagiwara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 29 days.

(21) Appl. No.: 14/036,425

(22) Filed: Sep. 25, 2013

(65) Prior Publication Data
US 2014/0115173 A1 Apr. 24, 2014

(30) Foreign Application Priority Data

Oct. 18, 2012 (JP) ................. 2012-231145

(51) Int. Cl.
H04L 29/06 (2006.01)
G06F 21/31 (2013.01)
(Continued)

(52) U.S. Cl.
CPC ............ *H04L 65/1069* (2013.01); *G06F 21/31* (2013.01); *H04L 63/10* (2013.01); *H04N 1/00267* (2013.01); *H04N 1/4413* (2013.01); *H04N 1/4433* (2013.01); *H04L 61/103* (2013.01)

(58) Field of Classification Search
CPC .................................................. H04L 65/1069

USPC ................ 709/222, 225, 227, 228; 348/14.08
See application file for complete search history.

(56) References Cited

U.S. PATENT DOCUMENTS

2003/0051139 A1  3/2003  Kubota
2003/0221011 A1  11/2003  Shitano (Continued)

FOREIGN PATENT DOCUMENTS

EP  1 501 016 A1  1/2005
EP  2 296 349 A1  3/2011

(Continued)

OTHER PUBLICATIONS

"Christie LWU505 Widescreen 1920x1200 Conference Room Projector"—Marc Davidson, Projector Central, Aug. 2011 http://www.christiedigital.com/SupportDocs/Anonymous/Christie-LWU505-review.pdf.*

(Continued)

Primary Examiner — Randy Scott
(74) Attorney, Agent, or Firm — Oblon, McClelland, Maier & Neustadt, L.L.P.

(57) ABSTRACT

An information processing system includes at least one first information processing device and a second information processing device. The second information processing device includes: an acquiring unit that acquires a second information in which IP information assigned to a first information processing device and first information that is different from the IP information and specifies the first information processing device are associated with each other; a second storage unit that stores at least one piece of the second information; a first receiving unit that receives an input character string input by a user; and a determining unit that determines a first information processing device identified by IP information included in second information that includes first information corresponding to the input character string among the at least one piece of the second information as a first information processing device to execute a process requested from the user.

14 Claims, 23 Drawing Sheets

(51) Int. Cl.
*H04N 1/00* (2006.01)
*H04N 1/44* (2006.01)
*H04L 29/12* (2006.01)

(56) References Cited

U.S. PATENT DOCUMENTS

2008/0028217 A1    1/2008   Kubota
2008/0074560 A1*   3/2008   Ichieda ................. 348/739
2010/0005150 A1*   1/2010   Kubota et al. ........... 709/212
2010/0088751 A1*   4/2010   Ando et al. ............. 726/5
2010/0257586 A1    10/2010  Kubota
2012/0311668 A1    12/2012  Kubota

FOREIGN PATENT DOCUMENTS

JP    2003-069923        3/2003
JP    2004118488 A   *   4/2004

OTHER PUBLICATIONS

Extended European Search Report issued Feb. 11, 2014, in European Patent Application No. 13186037.1.

* cited by examiner

| IDENTIFICATION INFORMATION | 1546 |
| --- | --- |
| IP ADDRESS | 124.123.120.024 |

} CONNECTION SETTING INFORMATION

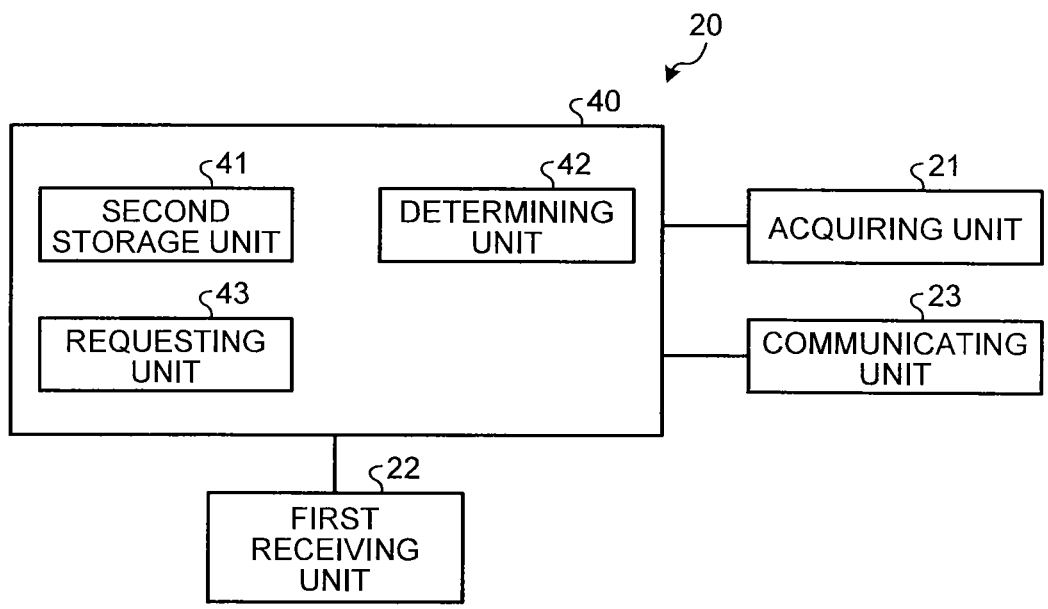

| IDENTIFICATION INFORMATION | 1546 |
| IP ADDRESS | 124.123.120.024 |
| NAME INFORMATION | Projector24 |

} CONNECTION SETTING INFORMATION

| IDENTIFICATION NUMBER | ITEM | DATA |
|---|---|---|
| 1 | IDENTIFICATION INFORMATION | 1546 |
| | IP ADDRESS | 124.123.120.024 |
| | NAME INFORMATION | Projector24 |
| 2 | IDENTIFICATION INFORMATION | 5462 |
| | IP ADDRESS | 124.123.120.157 |
| | NAME INFORMATION | Projector157 |
| 3 | IDENTIFICATION INFORMATION | 9624 |
| | IP ADDRESS | 124.123.120.064 |
| | NAME INFORMATION | Projector64 |
| ⋮ | ⋮ | ⋮ |

INFORMATION PROCESSING SYSTEM, INFORMATION PROCESSING DEVICE

CROSS-REFERENCE TO RELATED APPLICATION

The present application claims priority to and incorporates by reference the entire contents of Japanese Patent Application No. 2012-231145 filed in Japan on Oct. 18, 2012.

BACKGROUND OF THE INVENTION

1. Field of the Invention

The present invention relates to an information processing system, and an information processing device.

2. Description of the Related Art

For example, a technique in which, for the purpose of performing cryptographic communication from the perspective of preventing illegal access and data interception, a password is projected on a projection surface of a projector to allow an information terminal to input the password to establish cryptographic communication with the projector, and the screen of the information terminal is projected on a screen is known (for example, see Japanese Laid-open Patent Publication No. 2003-069923).

However, in the technique disclosed in Japanese Laid-open Patent Publication No. 2003-069923, there is a problem in that, since users need to input setting information such as an address or the like in addition to the password for cryptographic communication, it is difficult to designate a projector to execute projection.

In view of the above problem, there is a need to provide an information processing system and an information processing device capable of allowing users to easily designate an information processing device to execute a requested process.

SUMMARY OF THE INVENTION

It is an object of the present invention to at least partially solve the problems in the conventional technology.

An information processing system includes: at least one first information processing device; and a second information processing device connectable to the first information processing device. Each of the at least one first information processing device includes: a first storage unit that stores second information in which IP information assigned in advance to a first information processing device in order to identify the first information processing device on a network and first information that is different from the IP information and specifies the first information processing device are associated with each other; and a transmitting unit that transmits the second information stored in the first storage unit. The second information processing device includes: an acquiring unit that acquires the second information; a second storage unit that stores at least one piece of the second information acquired by the acquiring unit; a first receiving unit that receives an input character string indicating a character string input by a user; and a determining unit that determines a first information processing device identified by IP information included in second information that includes first information corresponding to the input character string among the at least one piece of the second information stored in the second storage unit as a first information processing device to execute a process requested from the user.

An information processing device is connectable to at least one external information processing device. The information processing device includes: an acquiring unit that acquires second information in which IP information assigned in advance to an external information processing device in order to identify the external information processing device on a network and first information that is different from the IP information and specifies the external information processing device are associated with each other; a storage unit that stores the second information acquired by the acquiring unit; a receiving unit that receives an input character string indicating a character string input by a user; and a determining unit that determines an external information processing device identified by IP information included in second information that includes first information corresponding to the input character string among at least one piece of the second information stored in the storage unit as an external information processing device to execute a process requested from the user.

An information processing device is connectable to an information processing terminal used by a user. The device includes: a first storage unit that stores second information in which IP information assigned in advance to the information processing device in order to identify the information processing device on a network and first information that is different from the IP information and specifies the information processing device are associated with each other; and a transmission control unit that performs control of transmitting the second information stored in the first storage unit to the information processing terminal. The information processing terminal includes: an acquiring unit that acquires the second information; a second storage unit that stores the second information acquired by the acquiring unit; a first receiving unit that receives an input character string indicating a character string input by the user; and a determining unit that determines an information processing device identified by IP information included in second information that includes first information corresponding to the input character string among at least one piece of the second information stored in the second storage unit as an information processing device to execute a process requested from the user.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a block diagram illustrating a functional configuration example of an information processing terminal;

FIG. 8 is a diagram illustrating an example of data configuration of a second storage unit;

DETAILED DESCRIPTION OF THE PREFERRED EMBODIMENTS

Hereinafter, embodiments of an information processing system, an information processing device, and a program according to the invention will be described in detail with reference to the accompanying drawings.

First Embodiment

Figure 1:
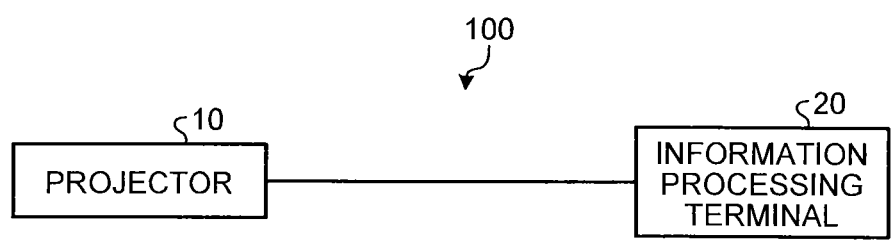
FIG. 1 is a block diagram illustrating a schematic configuration example of an information processing system according to a first embodiment.

FIG. 1 is a block diagram illustrating a schematic configuration example of an information processing system 100 according to the present embodiment. As illustrated in FIG. 1, the information processing system 100 includes a projector 10 and an information processing terminal 20 that can be connected to each other. The projector 10 and the information processing terminal 20 may be configured to communicate over wired connection and may be configured to communicate over wireless connection. When communicating over wired connection, the projector 10 and the information processing terminal 20 may be connected via a wired LAN cable, for example. Moreover, when communicating over wireless connection, the projector 10 and the information processing terminal 20 may be connected by a communication method called an ad-hoc mode, for example. In the present embodiment, the projector 10 corresponds to a "first information processing device" of the claims and the information processing terminal 20 corresponds to a "second information processing device" of the claims. However, the "first information processing device" and the "second information processing device" of the claims are not limited to this.

Figure 2:
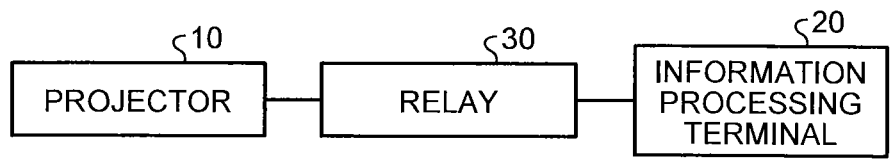
FIG. 2 is a block diagram illustrating a schematic configuration example of an information processing system according to a modification of the first embodiment.
Figure 3:
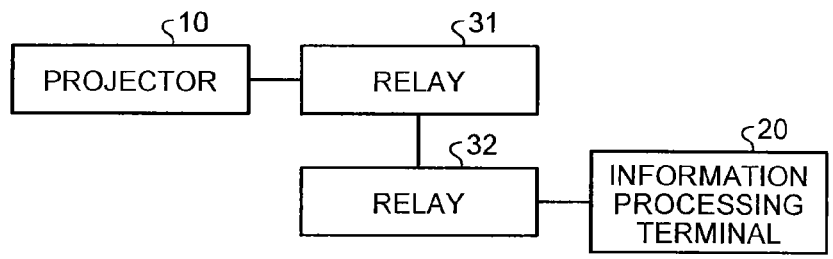
FIG. 3 is a block diagram illustrating a schematic configuration example of an information processing system according to a modification of the first embodiment.

Moreover, as illustrated in FIG. 2, the projector 10 and the information processing terminal 20 may be connected via a relay 30 such as a router, for example. The relay that connects the projector 10 and the information processing terminal 20 may not be a single relay. For example, as illustrated in FIG. 3, the projector 10 and the information processing terminal 20 may be connected to different relays 31 and 32, and may be connected to each other via these relays 31 and 32. However, in the example of FIG. 3, the relay 31 to which the projector 10 is connected needs to be capable of communicating with the relay 32 to which the information processing terminal 20 is connected. In the case of wireless connection, this corresponds to a case where both are connected by a communication method called an infrastructure mode. Since the relay has only a role of relaying communication between the projector 10 and the information processing terminal 20, the system configuration of FIG. 1 will be described by way of example.

Figure 4:
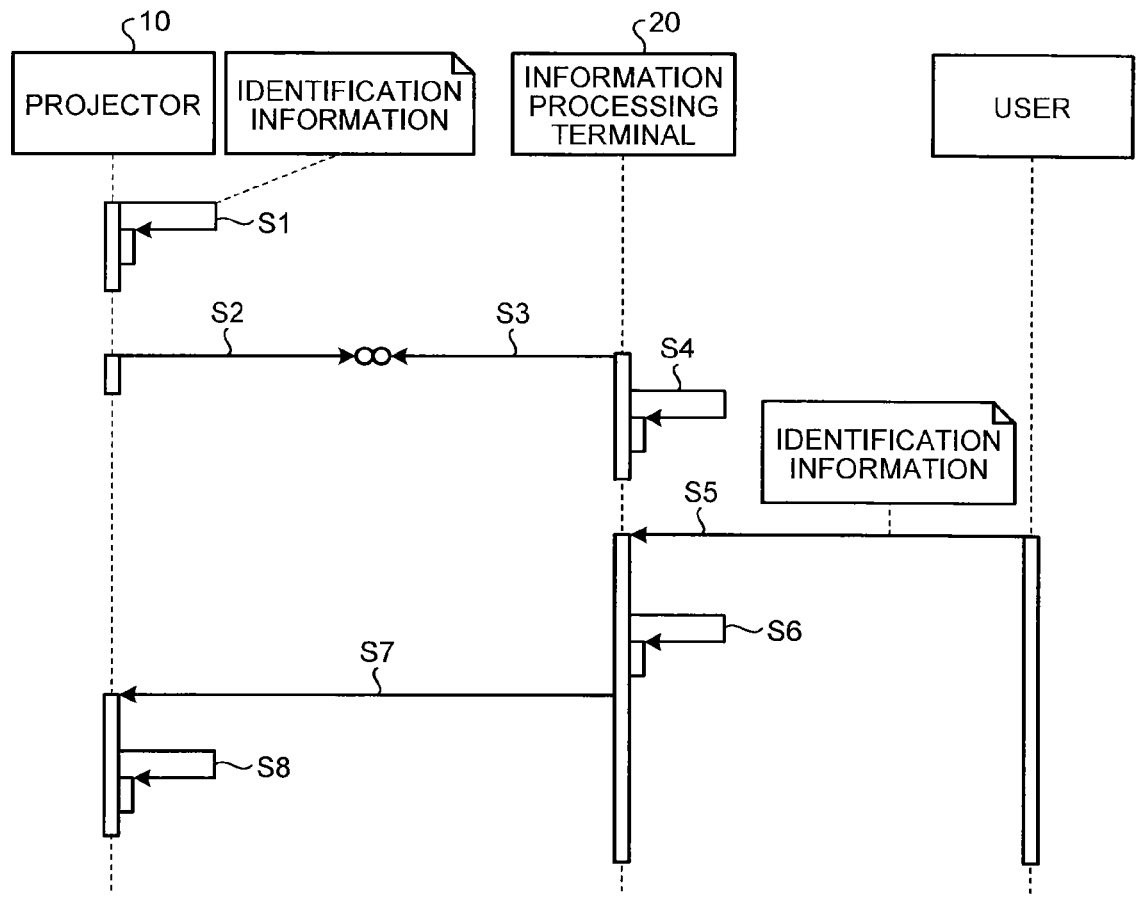
FIG. 4 is a sequence diagram illustrating an overview of an operation sequence of the information processing system according to the first embodiment.

FIG. 4 is a sequence (system sequence) diagram illustrating an overview of an operation sequence of the information processing system 100 of the present embodiment. As illustrated in FIG. 4, first, the projector 10 projects identification information (corresponding to "first information" of the claims) for specifying the projector 10 on a projection surface (screen) of the projector 10 (step S1). Subsequently, the projector 10 transmits connection setting information (corresponding to "second information" of the claims) in which the identification information and an IP address (corresponding to "IP information" of the claims) assigned in advance to the projector 10 in order to identify the projector 10 on a network are associated with each other, to the information processing terminal 20 (step S2).

Subsequently, the information processing terminal 20 acquires the connection setting information from the projector 10 (step S3) and stores the acquired connection setting information (step S4). Subsequently, a user checks the identification information projected on the projection surface of the projector 10, inputs a character string that constitutes the identification information to the information processing terminal 20, and issues a projection instruction (step S5). Subsequently, the information processing terminal 20 checks whether it has connection setting information that includes the identification information corresponding to the character string (input character string) input by the user (step S6). The "identification information corresponding to the input character string (first information)" may indicate identification information that is exactly identical to the input character string and may indicate identification information that is partially identical to the input character string (for example, including a case where three characters out of four characters are identical and a case where only the starting or ending character string is identical). In the first embodiment, the information processing terminal 20 checks whether it has connection setting information that includes identification information that is exactly identical to the input character string. When it is checked that it has the connection setting information that includes the identification information that is identical to the input character string, the information processing terminal 20 issues a projection request to the projector 10 identified by the IP address included in the connection setting information (step S7). More specifically, the information processing terminal 20 transmits projection request information for requesting projection of image data to the projector 10. The projection request information may include information for instructing projection of image data and information that includes image data to be projected. The projector 10 having received the projection request information projects image data included in the projection request information from the information processing terminal 20 on the projection surface (step S8).

Figures 5, 6:
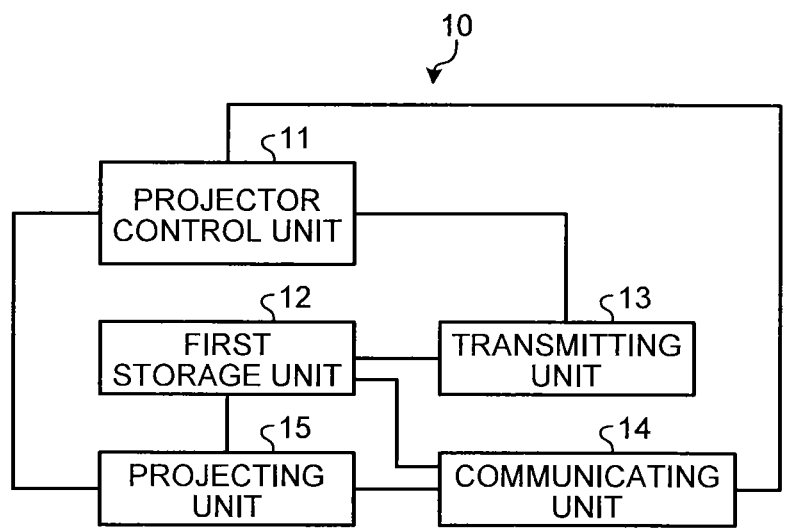
FIG. 5 is a block diagram illustrating a functional configuration example of a projector.
FIG. 6 is a diagram illustrating an example of connection setting information stored in a first storage unit.

Hereinafter, specific contents of the projector 10 and the information processing terminal 20 will be described. First, specific contents of the projector 10 will be described. FIG. 5 is a block diagram illustrating a functional configuration example of the projector 10. As illustrated in FIG. 5, the projector 10 includes a projector control unit 11, a first storage unit 12, a transmitting unit 13, a communicating unit 14, and a projecting unit 15. The projector control unit 11 controls the entire projector 10 in an integrated manner. The first storage unit 12 stores connection setting information in which the IP address of the projector 10 and the identification information for specifying the projector 10 are associated with each other. In this embodiment, the identification information is made up of a character string (which may be alphabetic letters, numbers, symbols, or a combination thereof) that is shorter than the character string that constitutes the IP address. As an example, the identification information of the present embodiment is made up of a predetermined four-digit number. FIG. 6 is a diagram illustrating an example of the connection setting information stored in the first storage unit 12.

Returning to FIG. 5, the description is continued. The transmitting unit 13 has a function of transmitting the connection setting information stored in the first storage unit 12 under the control of the projector control unit 11. In the present embodiment, the transmitting unit 13 performs a process of continuously transmitting the connection setting information stored in the first storage unit 12 to the information processing terminal 20 in response to the request from the projector control unit 11. This process is performed similarly in both the wired connection and the wireless connection. The communicating unit 14 has a function of communicating with the information processing terminal 20 via a network such as the Ethernet (registered trademark), for example. For example, the communicating unit 14 can also receive the projection request information from the information processing terminal 20. The projecting unit 15 has a function of projecting the identification information in the first storage unit 12 on the projection surface of the projector 10 and a function of projecting the image data included in the projection request information that the communicating unit 14 has received from the information processing terminal 20, on the projection surface of the projector 10 under the control of the projector control unit 11.

In the present embodiment, a computer device that includes a processing device such as a CPU and a storage device such as a ROM and a RAM are mounted on the projector 10, and the CPU deploys a program stored in the ROM or the like into the RAM and executes the program, whereby the functions of the respective units (the projector control unit 11, the transmitting unit 13, the communicating unit 14, and the projecting unit 15) of the projector 10 are realized. However, the invention is not limited to this, and for example, at least part of the functions of the respective units of the projector 10 may be realized by a dedicated hardware circuit. Moreover, the first storage unit 12 may be realized by a storage device or the like in the computer device mounted on the projector 10.

Next, the specific contents of the information processing terminal 20 will be described. FIG. 7 is a block diagram illustrating a functional configuration example of the information processing terminal 20. As illustrated in FIG. 7, the information processing terminal 20 includes an acquiring unit 21, a first receiving unit 22, a communicating unit 23, and a connection setting information management unit 40. The acquiring unit 21 has a function of acquiring the connection setting information transmitted from the projector 10. In this example, although only one projector 10 is included in the information processing system 100, when a plurality of projectors 10 is present, the acquiring unit 21 acquires the connection setting information transmitted from the respective projectors 10. The acquisition process of the acquiring unit 21 is performed similarly in both the wired connection and the wireless connection. The first receiving unit 22 receives the input character string indicating the character string input by the user. For example, the user can input the character string by operating a device such as a keyboard (not illustrated). Moreover, the first receiving unit 22 can also receive the input of a projection instruction instructing projection of image data. The communicating unit 23 has a function of communicating with the projector 10 via a network. For example, the communicating unit 23 can also transmit projection request information to the projector 10.

As illustrated in FIG. 7, the connection setting information management unit 40 includes a second storage unit 41, a determining unit 42, and a requesting unit 43. The second storage unit 41 stores the connection setting information acquired by the acquiring unit 21. That is, it can be understood that the second storage unit 41 stores at least one piece of connection setting information. FIG. 8 is a diagram illustrating an example of a data configuration of the second storage unit 41. In the example of FIG. 8, the second storage unit 41 stores an identification number for identifying connection setting information in association with the connection setting information. More specifically, the second storage unit 41 stores an item indicating identification information, data of the identification information, an item indicating an IP address, and data of the IP address in association with each identification number. In this example, the identification number associated with the connection setting information registered in the second storage unit 41 is a number that indicates the order of registration of the connection setting information into the second storage unit 41 (that is, the earlier the order of the connection setting information is registered in the second storage unit 41, the smaller the identification number associated with the connection setting information is). However, the invention is not limited to this.

The determining unit 42 determines the projector 10 identified by an IP address included in connection setting information that includes identification information (in the present embodiment, identification information that is exactly identical to the input character string) corresponding to the input character string received by the first receiving unit 22 among the at least one piece of connection setting information stored in the second storage unit 41 as the projector 10 to execute projection. That is, it can be understood that the determining unit 42 has a function of determining a second information processing device (the projector 10) identified by IP information (IP address) included in second information (connection setting information) that includes first information (identification information) corresponding to the input character string as an information processing device to execute a process requested from the user (that is, the information processing device to execute projection).

The requesting unit 43 requests the projector 10 determined by the determining unit 42 to execute projection (that is, the requesting unit 43 requests execution of a process requested from the user). In the present embodiment, the requesting unit 43 generates projection request information according to a projection instruction received by the first receiving unit 22. Moreover, the requesting unit 43 transmits the generated projection request information to the projector 10 determined by the determining unit 42 via the communicating unit 23.

In the present embodiment, a computer device that includes a processing device such as a CPU and a storage device such as a ROM and a RAM are mounted on the information processing terminal 20, and the CPU deploys a program stored in the ROM or the like in the RAM and executes the program, whereby the functions of the respective units (the acquiring unit 21, the first receiving unit 22, the communicating unit 23, and the connection setting information management unit 40) of the information processing terminal 20 are realized. However, the invention is not limited to this, and for example, at least part of the functions of the respective units of the information processing terminal 20 may be realized by a dedicated hardware circuit. Moreover, the second storage unit 41 may be realized by a storage device or the like in the computer device mounted on the information processing terminal 20.

Figure 9:
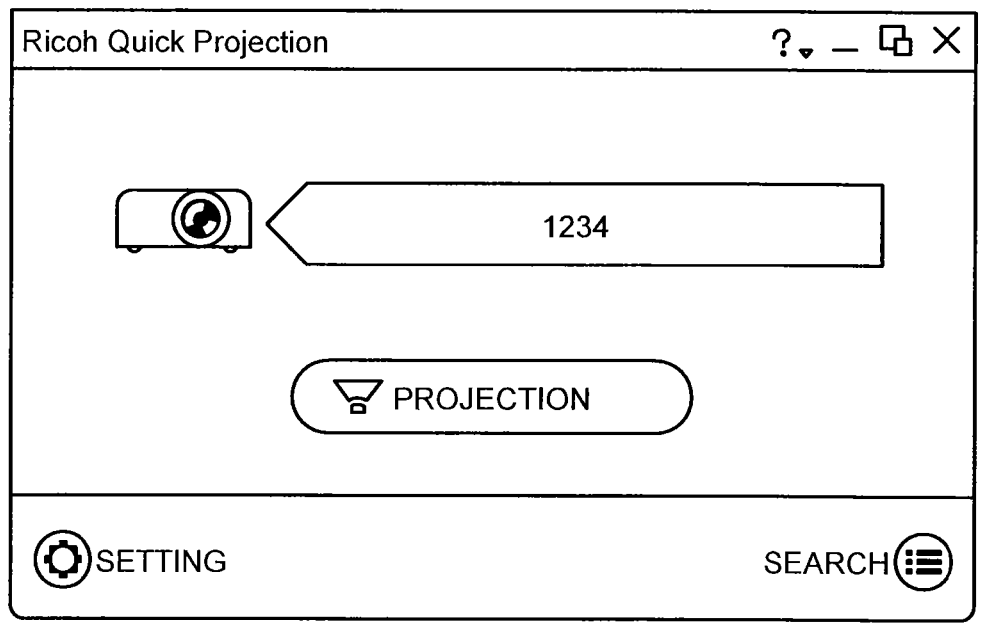
FIG. 9 is a diagram illustrating an example of an operation screen of the information processing terminal.

Next, an operation example of the information processing terminal 20 when the user inputs a character string that constitutes the identification information projected on the projection surface of the projector 10 and inputs a projection instruction will be described. FIG. 9 is a diagram illustrating an example of an operation screen (UI) of the information processing terminal 20. In this example, the user inputs a character string "1234" that constitutes the identification information projected on the projection surface of the projector 10 and clicks on an icon (in the example of FIG. 9, a button on which characters "projection" are displayed) for inputting a projection instruction.

Figure 10:
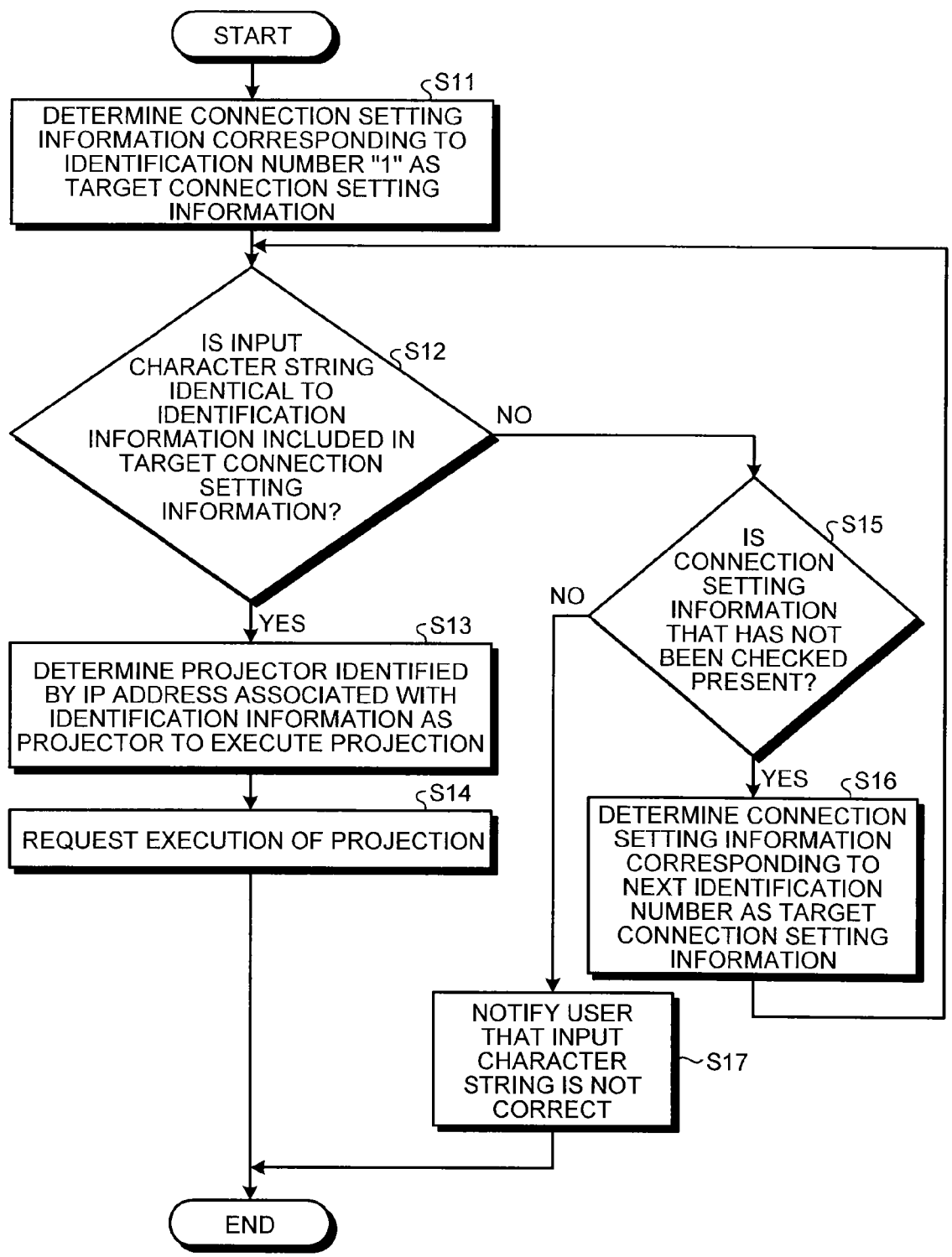
FIG. 10 is a flowchart illustrating an operation example of the information processing terminal according to the first embodiment.

FIG. 10 is a flowchart illustrating an operation example of the information processing terminal 20 when the user inputs a character string that constitutes the identification information projected on the projection surface of the projector 10 and inputs a projection instruction. In this example, it is assumed that a plurality of pieces of connection setting information are stored in the second storage unit 41 and the identification information and the IP address included in the respective pieces of connection setting information are different.

As illustrated in FIG. 10, first, the determining unit 42 determines connection setting information corresponding to the identification number "1" among the plurality of pieces of connection setting information stored in the second storage unit 41 as target connection setting information (step S11). Subsequently, the determining unit 42 determines whether the input character string is identical to the identification information included in the target connection setting information (step S12). When it is determined that the input character string is identical to the identification information included in the target connection setting information (YES in step S12), the determining unit 42 determines the projector 10 identified by IP address included in the connection setting information as the projector 10 to execute projection (step S13). Subsequently, the requesting unit 43 requests the projector 10 determined by the determining unit 42 to execute projection (step S14).

On the other hand, when it is determined in step S12 that the input character string is not identical to the identification information included in the target connection setting information (NO in step S12), the determining unit 42 determines whether connection setting information that has not been checked is present in the plurality of pieces of connection setting information stored in the second storage unit 41 (step S15). When it is determined that the unchecked connection setting information is present (YES in step S15), the determining unit 42 selects connection setting information corresponding to the next identification number "2" as target connection setting information (step S16) and repeats the processes in step S12 and thereafter. Moreover, when it is determined in step S15 that the unchecked connection setting information is not present (NO in step S15), the connection setting information management unit 40 performs (for example, the determining unit 42 may perform) a process of notifying the user that the input character string is not correct (step S17).

Figure 11:
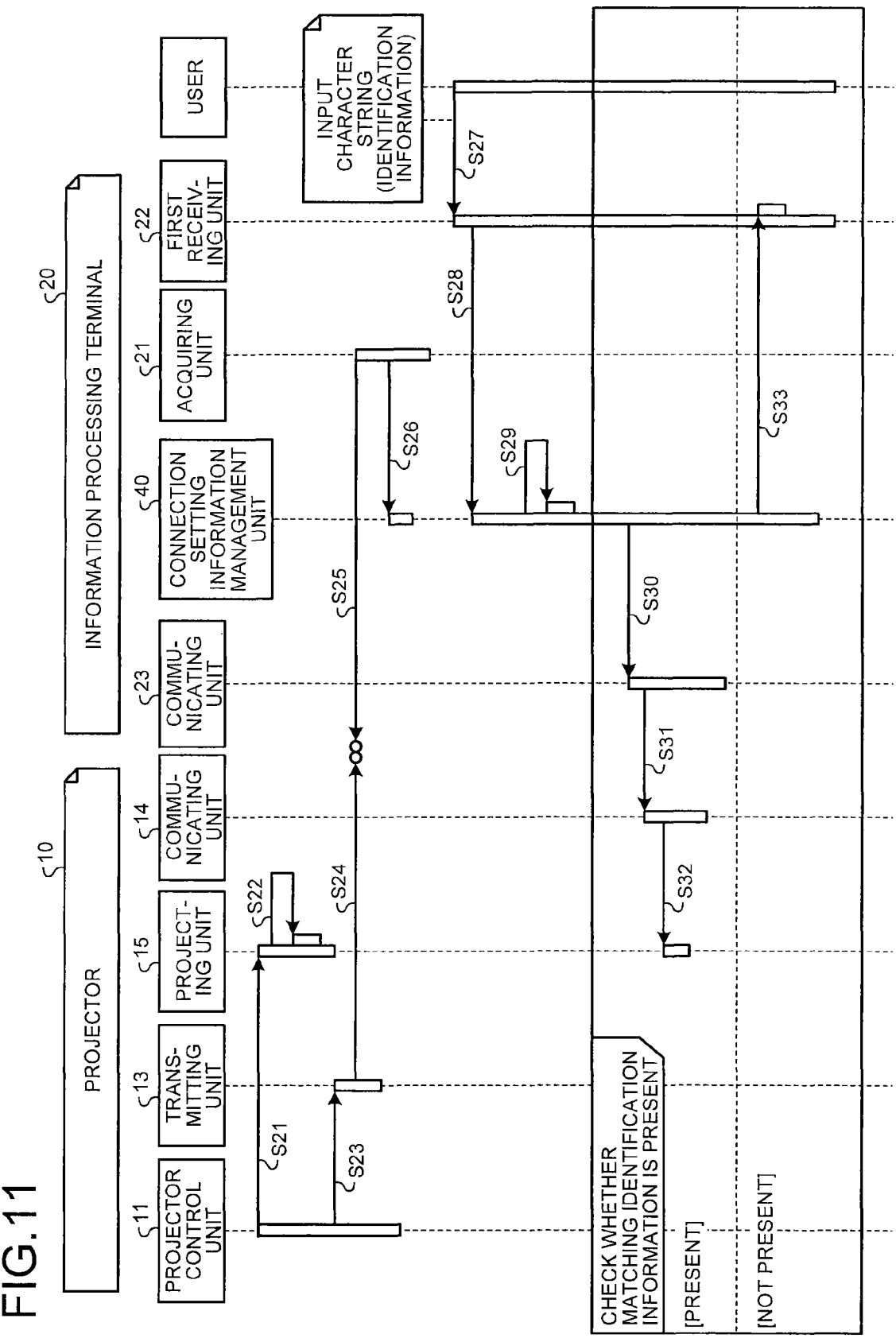
FIG. 11 is a sequence diagram illustrating an example of a specific operation sequence of the information processing system according to the first embodiment.

FIG. 11 is a sequence diagram illustrating an example of a specific operation sequence of the information processing system 100 according to the present embodiment. As illustrated in FIG. 11, first, the projector control unit 11 instructs the projecting unit 15 to project the identification information included in the connection setting information stored in the first storage unit 12 (step S21). This is to allow the user to visually recognize the identification information of the projector 10. The projecting unit 15 having received the instruction from the projector control unit 11 projects the identification information included in the connection setting information stored in the first storage unit 12 on the projection surface of the projector 10 (step S22).

Subsequently, the projector control unit 11 instructs the transmitting unit 13 to transmit the connection setting information stored in the first storage unit 12 (step S23). The transmitting unit 13 having received the instruction from the projector control unit 11 transmits the connection setting information via radio waves (step S24).

Subsequently, the acquiring unit 21 of the information processing terminal 20 acquires the connection setting information (step S25). The timing at which the acquiring unit 21 starts the connection setting information acquisition process may occur after the transmission of radio waves from the projector 10 is detected and may be the timing at which the information processing terminal 20 is started and the timing at which the user inputs a connection setting information acquisition request to the information processing terminal 20. Subsequently, the acquiring unit 21 registers the acquired connection setting information in the second storage unit 41 (the connection setting information management unit 40) (step S26). Since the second storage unit 41 can store a plurality of pieces of connection setting information, when a plurality of projectors 10 is included in the information processing system 100, the sequence of steps S21 to S26 is performed separately.

Subsequently, the user having visually recognized the identification information projected on the projection surface of the projector 10 inputs a character string that constitutes the visually recognized identification information to the operation screen (see FIG. 9) of the information processing terminal 20 and inputs a projection instruction (step S27). The first receiving unit 22 delivers the received character string (the input character string) and the projection instruction to the connection setting information management unit 40 (step S28). Subsequently, the determining unit 42 (the connection setting information management unit 40) compares the input character string with the identification information included in the connection setting information for each of the pieces of connection setting information stored in the second storage unit 41 (step S29). When connection setting information that includes the identification information identical to the input character string is present, the determining unit 42 determines the projector 10 identified by IP address included in the connection setting information as the projector 10 to execute projection. Subsequently, the connection setting information management unit 40 (the requesting unit 43) requests the projector 10 determined by the determining unit 42 to execute projection (step S30). More specifically, the requesting unit 43 transmits the projection request information to the projector 10 determined by the determining unit 42 via the communicating unit 23. When the projection request information is received by the communicating unit 14 of the projector 10 (step S31), the communicating unit 14 delivers the received projection request information to the projecting unit 15 (step S32). Moreover, the projecting unit 15 projects the image data included in the projection request information on the projection surface.

On the other hand, when it is determined in step S29 that the connection setting information including the identification information identical to the input character string is not present, the connection setting information management unit 40 notifies the user that the input character string is not correct (step S33).

As described above, in the present embodiment, the information processing terminal 20 to which at least one projector 10 can be connected and which the user uses includes the acquiring unit 21 that acquires connection setting information (including identification information and an IP address) transmitted from the respective projectors 10, the second storage unit 41 that stores the connection setting information acquired by the acquiring unit 21, and the first receiving unit 22 that receives the input character string indicating the character string input by the user. Moreover, the information processing terminal 20 determines the projector 10 identified by the IP information included in the connection setting information that includes the identification information identical to the input character string among at least one piece of connection setting information stored in the second storage unit 41 as the projector 10 to execute projection. Thus, the user can designate the projector 10 to execute projection by inputting the character string that constitutes the identification information. Therefore, it is possible to obtain an advantageous effect that users can easily designate the projector 10 as compared to a configuration in which as in the related art, when designating the projector 10 to execute projection, the users have to input setting information such as an address as well as the character string such as a password.

Moreover, in the present embodiment, when designating the projector to execute projection, the user only needs to input the character string that constitutes the identification information that is shorter than the character string of the IP address. Thus, it is possible to obtain an advantage that the user can easily designate the projector 10 as compared to a configuration in which the user designates the projector 10 by inputting the relatively long IP address.

Second Embodiment

Next, a second embodiment will be described. The second embodiment is different from the first embodiment in that a plurality of projectors 110 is included in an information processing system 200, and the same identification information is assigned to the multiple projectors 110. The second embodiment will be described in detail below. Description of the same portions as those of the first embodiment will be omitted appropriately.

Figure 12:
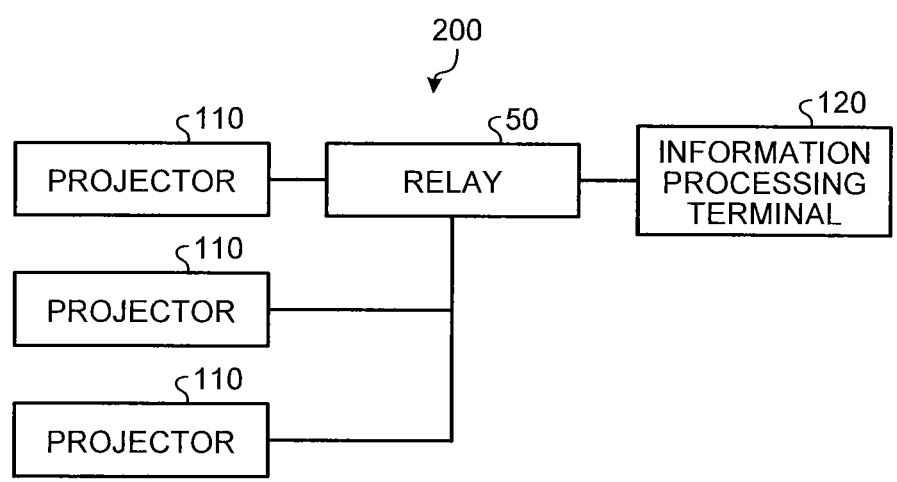
FIG. 12 is a block diagram illustrating a schematic configuration example of an information processing system according to a second embodiment.

FIG. 12 is a block diagram illustrating a schematic configuration example of the information processing system 200 according to the second embodiment. As illustrated in FIG. 12, the information processing system 200 includes a plurality of projectors 110 and an information processing terminal 120 that can be connected to each other via a relay 50. When the projector 110 and the relay 50 or the relay 50 and the information processing terminal 120 are wire-connected, the connection may be made via a wired LAN cable. When connected wirelessly, the connection may be made by a communication method called an infrastructure mode.

Figure 13:
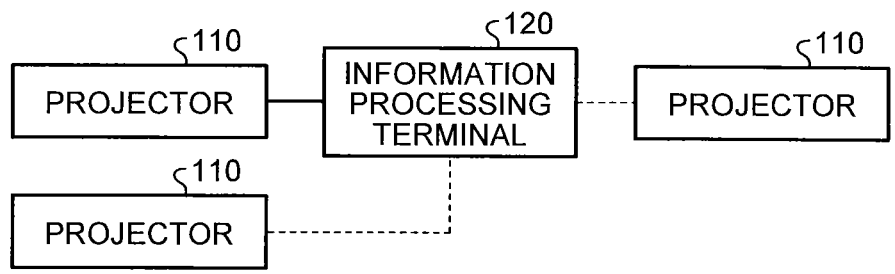
FIG. 13 is a block diagram illustrating a schematic configuration example of an information processing system according to a modification of the second embodiment.

Moreover, for example, as illustrated in FIG. 13, each of the plurality of projectors 110 and the information processing terminal 120 may be connected without going through the relay. In this case, when the relay is not present, any one of the projectors 110 is directly connected to the information processing terminal 120. When the projector 110 and the information processing terminal 120 are wire-connected, a wire LAN cable may be reconnected to the projection target projector 110. When both are connected wirelessly, both may be connected by switching an ad-hoc network according to the projector 110 by a communication method called an ad-hoc mode. In the second embodiment, the system configuration of FIG. 12 will be described by way of example.

Figure 14:
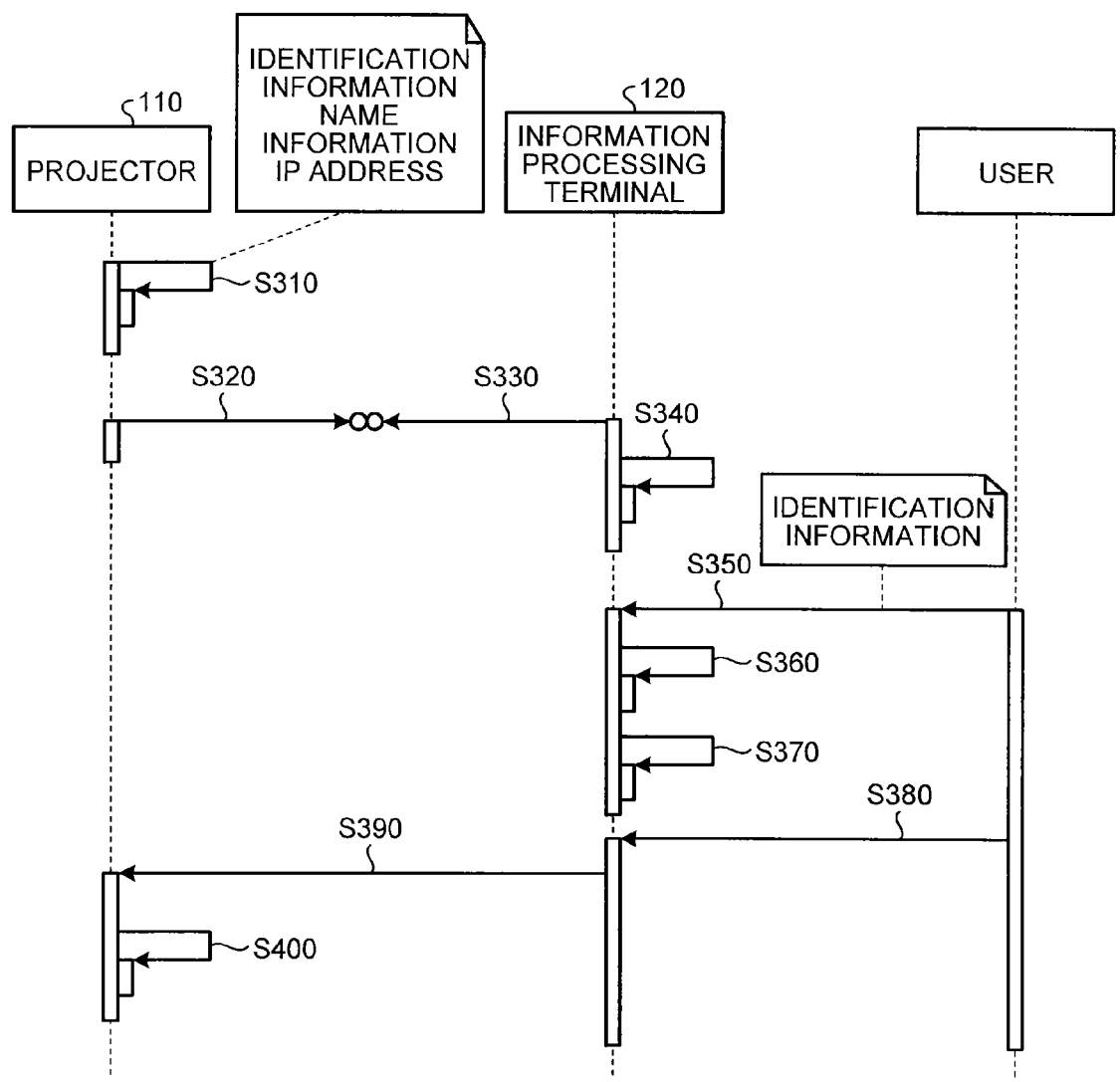
FIG. 14 is a sequence diagram illustrating an overview of an operation sequence of the information processing system according to the second embodiment.

FIG. 14 is a sequence (system sequence) diagram illustrating an overview of an operation sequence of the information processing system 200 of the present embodiment. The sequence of steps S310 to S340 of FIG. 14 is repeated by the number of projectors 110. First, the projector 110 projects identification information for specifying the projector 110 and name information indicating the name of the projector 110 on the projection surface of the projector 110 (step S310). Subsequently, the projector 110 transmits connection setting information in which the identification information, the name information, and an IP address are associated with one another to the information processing terminal 120 (step S320). The present embodiment is different from the first embodiment in that the connection setting information is configured to associate the identification information, the name information, and the IP address with one another. However, the invention is not limited to this, and for example, similarly to the first embodiment, the connection setting information may be configured to associate the identification information and the IP address with each other.

Subsequently, the information processing terminal 120 acquires the connection setting information from the projector 110 (step S330) and stores the acquired connection setting information (step S340). The sequence of steps S310 to S340 is repeated by the number of projectors 110, and the information processing terminal 120 stores a number of pieces of connection setting information corresponding to the number of projectors 110.

Subsequently, the user checks the identification information projected on the projection surface of the projector 110, inputs a character string that constitutes the identification information of the projector 110 to execute projection to the information processing terminal 120, and issues a projection instruction (step S350). Subsequently, the information processing terminal 120 checks whether it has connection setting information that includes the identification information corresponding to the character string (input character string) input by the user (step S360). The "identification information corresponding to the input character string" may indicate identification information that is exactly identical to the input character string and may indicate identification information that is partially identical to the input character string. In the second embodiment, the information processing terminal 120 checks whether it has connection setting information that includes identification information that is exactly identical to the input character string. Here, when it is determined that a plurality of pieces of connection setting information that include the identification information identical to the input character string are present, the information processing terminal 120 displays a screen (selection screen) for prompting selection of any one of the pieces of connection setting information (step S370). Subsequently, the user makes an input (selection input) for selecting any one of the pieces of connection setting information to the selection screen (step S380). The information processing terminal 120 issues a projection request to the projector 110 identified by the IP address included in the connection setting information (the connection setting information for which the selection input is entered) selected by the user (step S390). More specifically, the information processing terminal 120 transmits the projection request information to the projector 110. The projector 110 having received the projection request information projects the image data included in the projection request information from the information processing terminal 120 on the projection surface (step S400).

Figures 15, 16:
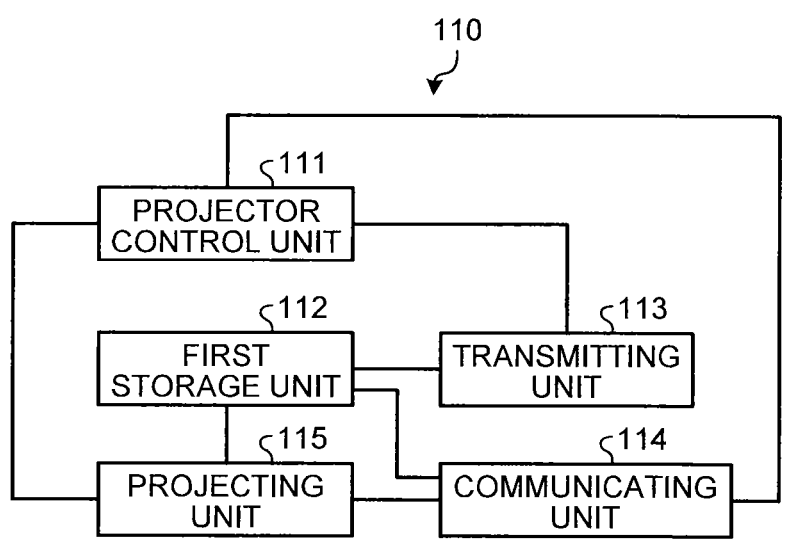
FIG. 15 is a block diagram illustrating a functional configuration example of a projector.
FIG. 16 is a diagram illustrating an example of connection setting information stored in a first storage unit.

Hereinafter, specific contents of the projector 110 and the information processing terminal 120 will be described. First, specific contents of the projector 110 will be described. FIG. 15 is a block diagram illustrating a functional configuration example of the projector 110. As illustrated in FIG. 15, the projector 110 includes a projector control unit 111, a first storage unit 112, a transmitting unit 113, a communicating unit 114, and a projecting unit 115. The projector control unit 111 controls the entire projector 110 in an integrated manner. The first storage unit 112 stores connection setting information in which the IP address of the projector 110, the identification information for specifying the projector 110, and the name information indicating the name of the projector 110 are associated with one another. FIG. 16 is a diagram illustrating an example of the connection setting information stored in the first storage unit 112.

Figures 17, 18:
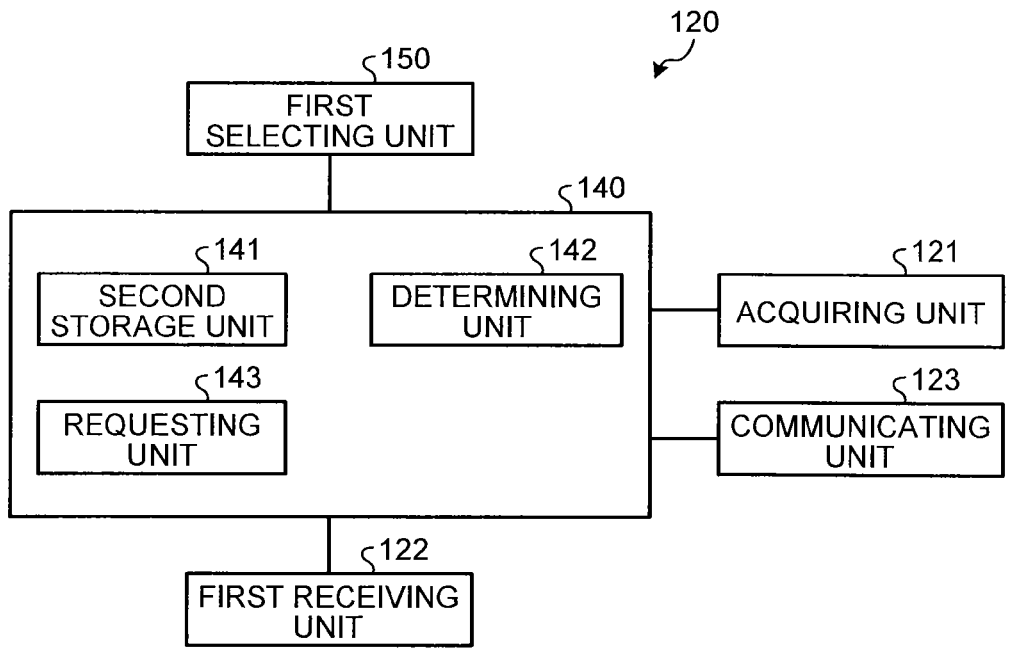
FIG. 17 is a block diagram illustrating a functional configuration example of an information processing terminal.
FIG. 18 is a diagram illustrating an example of a data configuration of a second storage unit.

Next, specific contents of the information processing terminal 120 will be described. FIG. 17 is a block diagram illustrating a functional configuration example of the information processing terminal 120. As illustrated in FIG. 17, the information processing terminal 120 includes an acquiring unit 121, a first receiving unit 122, communicating unit 123, a connection setting information management unit 140, and a first selecting unit 150. The function of the acquiring unit 121 is the same as the function of the acquiring unit 21 of the first embodiment. The function of the first receiving unit 122 is the same as the function of the first receiving unit 22 of the first embodiment. The function of the communicating unit 123 is the same as the function of the communicating unit 23 of the first embodiment.

As illustrated in FIG. 17, the connection setting information management unit 140 includes a second storage unit 141, a determining unit 142, and a requesting unit 143. The second storage unit 141 stores the connection setting information acquired by the acquiring unit 121. In this example, since the acquiring unit 121 acquires the respective pieces of connection setting information from the plurality of projectors 110, a plurality of pieces of connection setting information are registered in the second storage unit 141. FIG. 18 is a diagram illustrating an example of a data configuration of the second storage unit 141. In the example of FIG. 18, the second storage unit 141 stores the identification number for identifying the connection setting information in association with the connection setting information.

Returning to FIG. 17, the description is continued. The determining unit 142 determines whether connection setting information including identification information (in the present embodiment, identification information that is exactly identical to the input character string) corresponding to the input character string received by the first receiving unit 122 is present among the plurality of pieces of connection setting information stored in the second storage unit 141. When a plurality of pieces of connection setting information that include the identification information identical to the input character string are present, the determining unit 142 notifies the first selecting unit 150 of notification information indicating that there are a plurality of pieces of connection setting information that include the identification information identical to the input character string. For example, the notification information includes information that can specify the connection setting information that includes the identification information identical to the input character string, or the like. Specific contents of the first selecting unit 150 will be described later. The determining unit 142 determines the projector 110 identified by IP address included in the connection setting information selected by the first selecting unit 150 as the projector 110 to execute projection. The function of the requesting unit 143 is the same as the function of the requesting unit 43 of the first embodiment.

Figure 19:
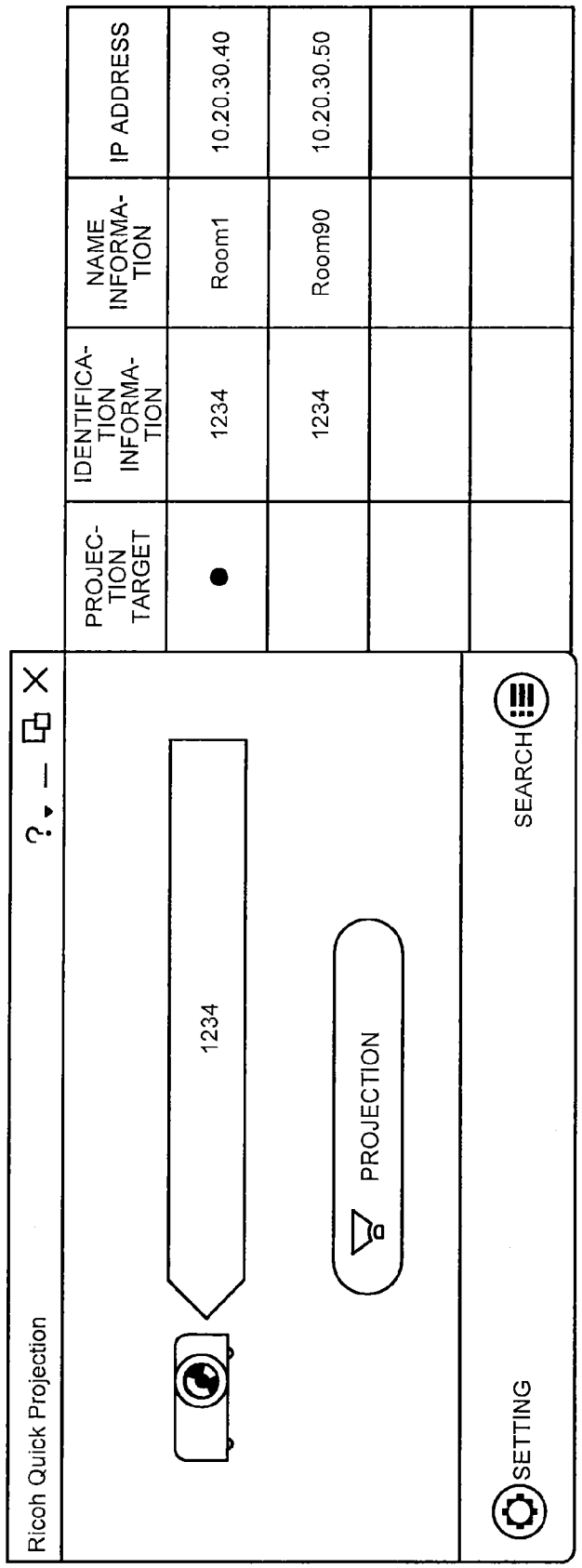
FIG. 19 is a diagram illustrating an example of an operation screen of the information processing terminal.

When the notification information indicating that there are a plurality of pieces of connection setting information that include the identification information identical to the input character string is notified from the determining unit 142, the first selecting unit 150 displays a screen for prompting selection of any one of the plurality of pieces of connection setting information indicated by the notification information and selects the connection setting information for which the selection input is entered. Moreover, the first selecting unit 150 notifies the determining unit 142 of the selected connection setting information. FIG. 19 is a diagram illustrating an example of an operation screen (UI) of the information processing terminal 120. In the example of FIG. 19, a screen for prompting selection of any one of two pieces of connection setting information that include the identification information "1234" is displayed, and the input for selecting the connection setting information in which the identification information "1234," the name information "Room1," and the IP address "10.20.30.40" are associated is entered.

Figure 20:
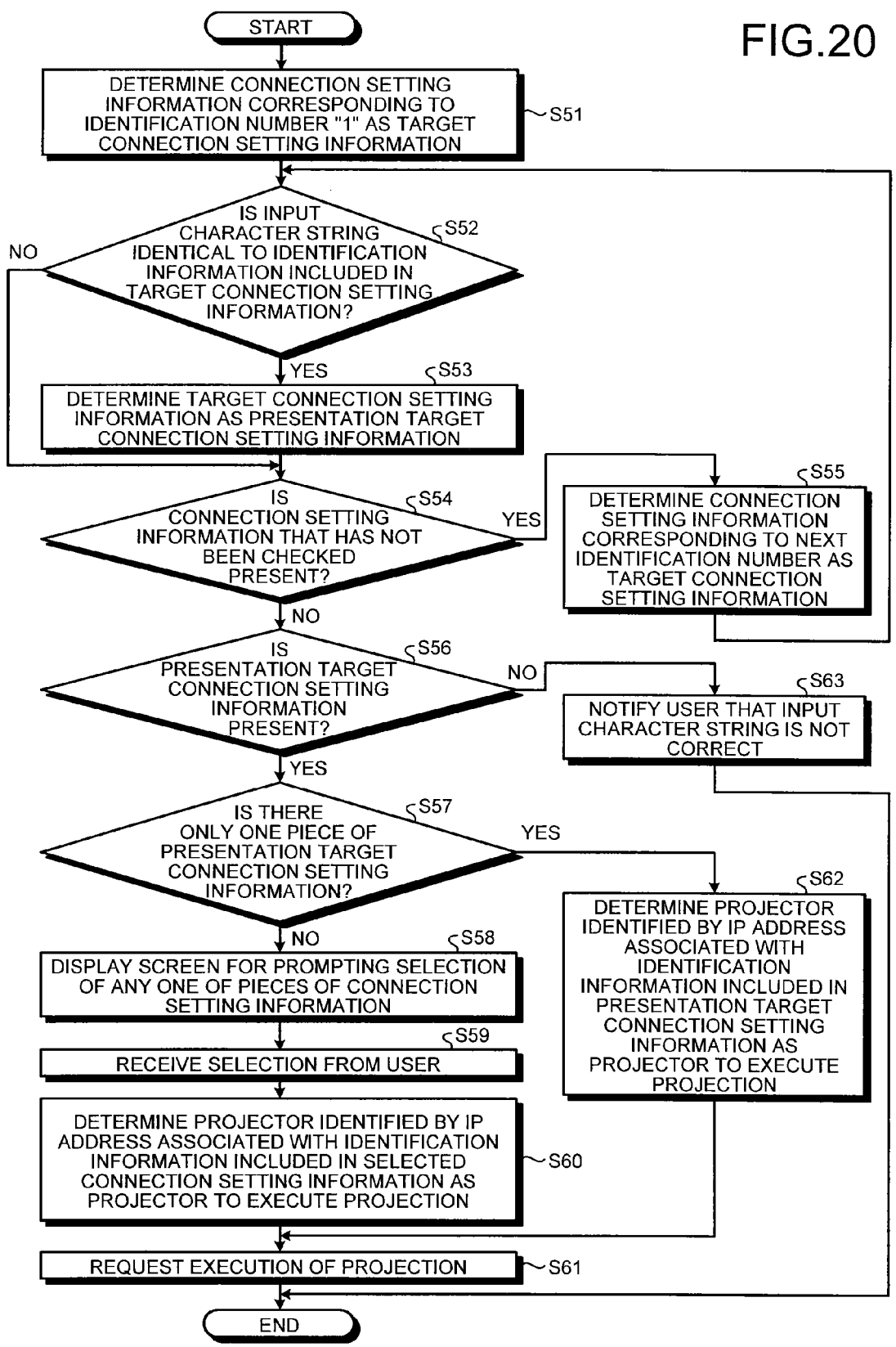
FIG. 20 is a flowchart illustrating an operation example of the information processing terminal according to the second embodiment.

Next, an operation example of the information processing terminal 120 when the user inputs a character string that constitutes the identification information projected on the projection surface of any one of the projectors 110 and inputs a projection instruction will be described. FIG. 20 is a flowchart illustrating an operation example of the information processing terminal 120 when the user inputs a character string that constitutes the identification information projected on the projection surface of any one of the projectors 110 and inputs a projection instruction.

As illustrated in FIG. 20, first, the determining unit 142 determines connection setting information corresponding to the identification number "1" among the plurality of pieces of connection setting information stored in the second storage unit 141 as target connection setting information (step S51). Subsequently, the determining unit 142 determines whether the input character string is identical to the identification information included in the target connection setting information (step S52). When it is determined that the input character string is identical to the identification information included in the target connection setting information (YES in step S52), the determining unit 142 determines the connection setting information as a target (presentation target) to be presented by the first selecting unit 150 (step S53). Subsequently, the determining unit 142 determines whether unchecked connection setting information is present in the plurality of pieces of connection setting information stored in the second storage unit 141 (step S54). When it is determined that the unchecked connection setting information is present (YES in step S54), the determining unit 142 selects connection setting information corresponding to the next identification number "2" as target connection setting information (step S55) and repeats the processes in step S52 and thereafter. Moreover, when it is determined in step S54 that the unchecked connection setting information is not present (NO in step S54), the determining unit 142 determines whether presentation target connection setting information is present (step S56).

When it is determined in step S56 that the presentation target connection setting information is present (YES in step S56), the determining unit 142 determines whether there is only one piece of presentation target connection setting information (step S57). When it is determined that there are a plurality of pieces of presentation target connection setting information (NO in step S57), the determining unit 142 notifies the first selecting unit 150 of notification information indicating that there are a plurality of pieces of connection setting information that include the identification information identical to the input character string, and the first selecting unit 150 displays a screen for prompting selection of any one of the plurality of pieces of connection setting information indicated by the notification information (step S58). Moreover, upon receiving the selection from the user (step S59), the first selecting unit 150 selects the connection setting information for which the selection input is entered and notifies the determining unit 142 of the selected connection setting information. In response to this notification, the determining unit 142 determines the projector 110 identified by the IP address included in the connection setting information selected by the first selecting unit 150 as the projector 110 to execute projection (step S60). Subsequently, the requesting unit 143 requests the projector 110 determined by the determining unit 142 to execute projection (step S61).

On the other hand, when it is determined in step S57 that there is only one piece of presentation target connection setting information (YES in step S57), the determining unit 142 does not notify the first selecting unit 150 of the notification information but determines the projector 10 identified by the IP address included in the presentation target connection setting information as the projector 10 to execute projection (step S62). Then, the flow proceeds to step S61.

Moreover, when it is determined in step S56 that the presentation target connection setting information is not present (NO in step S56), the connection setting information management unit 140 performs (for example, the determining unit 142 may perform) a process of notifying the user that the input character string is not correct (step S63).

Figure 21:
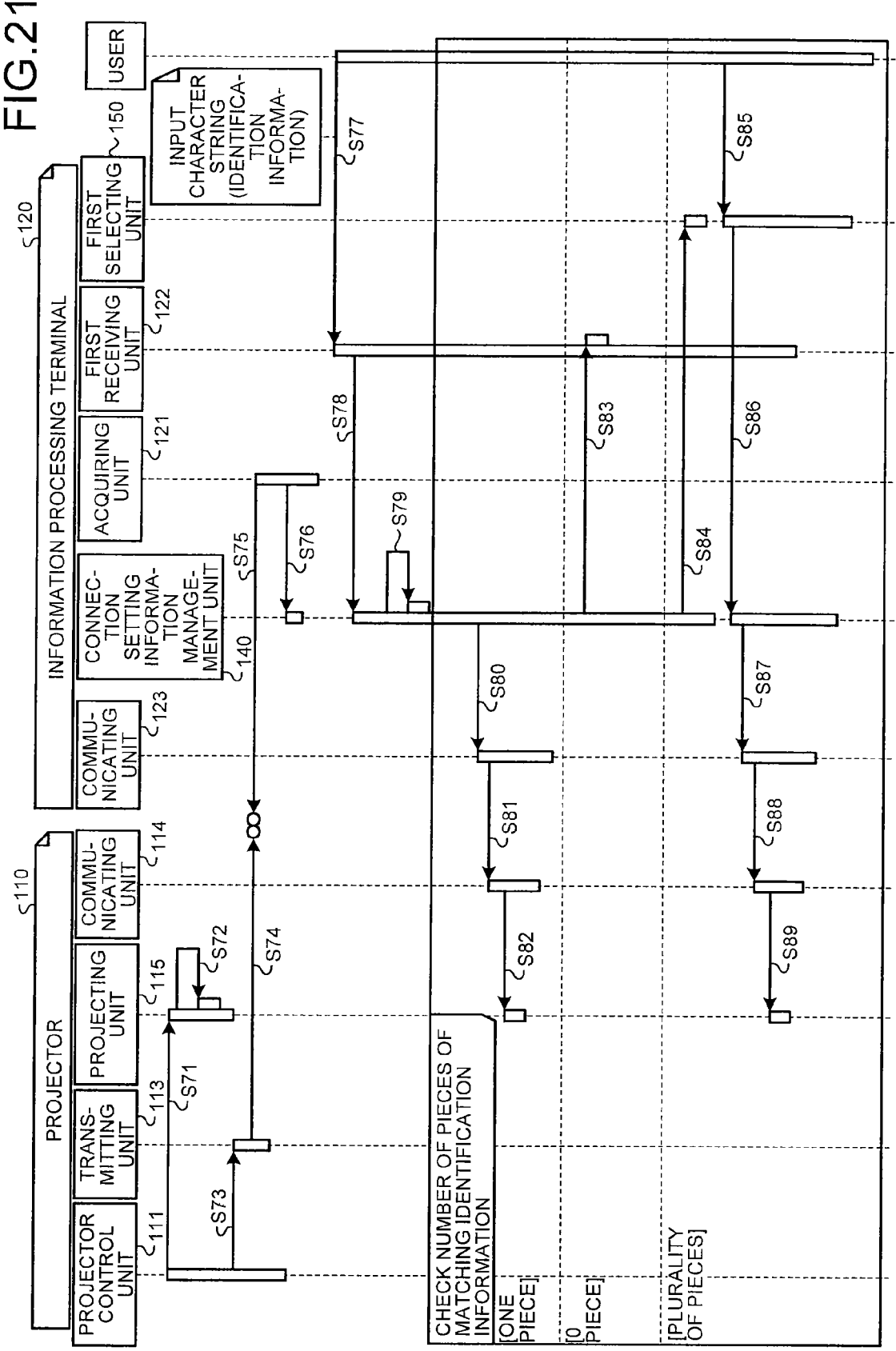
FIG. 21 is a sequence diagram illustrating an example of a specific operation sequence of the information processing system according to the second embodiment.

FIG. 21 is a sequence diagram illustrating an example of a specific operation sequence of the information processing system 200 according to the present embodiment. As illustrated in FIG. 21, first, the projector control unit 111 instructs the projecting unit 115 to project the identification information and the name information included in the connection setting information stored in the first storage unit 112 (step S71). The projecting unit 115 having received the instruction from the projector control unit 111 projects the identification information and the name information included in the connection setting information stored in the first storage unit 112 on the projection surface of the projector 110 (step S72).

Subsequently, the projector control unit 111 instructs the transmitting unit 113 to transmit the connection setting information stored in the first storage unit 112 (step S73). The transmitting unit 113 having received the instruction from the projector control unit 111 transmits the connection setting information via radio waves (step S74).

Subsequently, the acquiring unit 121 of the information processing terminal 120 acquires the connection setting information (step S75). Subsequently, the acquiring unit 121 registers the acquired connection setting information in the second storage unit 141 (the connection setting information management unit 140) (step S76). The sequence of steps S71 to S76 is repeated by the number of projectors 110 included in the information processing system 200.

Subsequently, the user having visually recognized the identification information projected on the projection surface of the projector 110 inputs a character string that constitutes the visually recognized identification information to the operation screen (see FIG. 19) of the information processing terminal 120 and inputs a projection instruction (step S77). The first receiving unit 122 delivers the character string (the input character string) and the projection instruction, which are input by the user, to the connection setting information management unit 140 (step S78). Subsequently, the determining unit 142 (the connection setting information management unit 140) compares the input character string with the identification information included in the connection setting information for each of the pieces of connection setting information stored in the second storage unit 141 (step S79).

When only one piece of connection setting information that includes the identification information identical to the input character string is present among the plurality of pieces of connection setting information stored in the second storage unit 141, the determining unit 142 determines the projector 110 identified by IP address included in the connection setting information as the projector 110 to execute projection.

Moreover, the connection setting information management unit 140 (the requesting unit 143) requests the projector 110 determined by the determining unit 142 to execute projection (step S80). More specifically, the requesting unit 143 transmits the projection request information to the projector 110 determined by the determining unit 142 via the communicating unit 123. When the projection request information is received by the communicating unit 114 of the projector 110 (step S81), the communicating unit 114 delivers the received projection request information to the projecting unit 115 (step S82). Moreover, the projecting unit 115 projects the image data included in the projection request information on the projection surface.

On the other hand, when it is determined in step S79 that the connection setting information including the identification information identical to the input character string is not present, the connection setting information management unit 140 notifies the user that the input character string is not correct (step S83).

On the other hand, when it is determined in step S79 that a plurality of pieces of connection setting information that include the identification information identical to the input character string are present, the determining unit 142 notifies the first selecting unit 150 of the notification information and the first selecting unit 150 displays a screen for prompting selection of any one of the plurality of pieces of connection setting information indicated by the notification information (step S84). The user having seen the screen enters an input for selecting any one of the pieces of connection setting information (step S85), and the first selecting unit 150 selects the connection setting information for which the selection input is entered by the user. Moreover, the first selecting unit 150 notifies the determining unit 142 of the selected connection setting information (step S86). The determining unit 142 having been notified from the first selecting unit 150 determines the projector 10 identified by IP address included in the connection setting information selected by the first selecting unit 150 as the projector 110 to execute projection. Moreover, the connection setting information management unit 140 (the requesting unit 143) requests the projector 110 determined by the determining unit 142 to execute projection (step S87). More specifically, the requesting unit 143 transmits the projection request information to the projector 110 determined by the determining unit 142 via the communicating unit 123. When the projection request information is received by the communicating unit 114 of the projector 110 (step S88), the communicating unit 114 delivers the received projection request information to the projecting unit 115 (step S89). Moreover, the projecting unit 115 projects the image data included in the projection request information on the projection surface.

While embodiments of the invention have been described, the respective embodiments are presented as examples and are not intended to limit the scope of the invention. The invention is not limited to the respective embodiments described above as they are, but in an implementation phase, may be embodied by modifying constituent components without departing from the spirit thereof. Moreover, various inventions can be formed by appropriately combining a plurality of constituent components disclosed in the respective embodiments described above. For example, several constituent components may not be provided from all constituent components illustrated in the embodiments.

(Modifications)

Hereinafter, modifications will be described. The following modifications can be optionally combined and can be also combined with the first or second embodiment described above.

(1) Modification 1

In the above embodiments, although the projector 10 (110) projects the identification information in order to notify the user of the identification information for specifying the projector 10 (110), the invention is not limited to this, and for example, the projector 10 (110) may not project the identification information in order to notify the identification information. For example, a label on which the identification information is described may be attached to the main body of the projector 10 (110), and sound for notifying the user of the identification information may be output from a speaker or the like according to a user's operation. That is, a method of notifying the user of the identification information is optional. However, according to the above embodiments, it is possible to obtain an advantage that the identification information of the projector 10 (110) can be easily notified to the user by projecting the identification information on the projection screen of the projector 10 (110).

(2) Modification 2

In the above embodiments, although a projector has been described as an example of an information processing device that is connected to the information processing terminal used by the user, the invention is not limited to this. That is, a first information processing device connected to the information processing terminal used by the user may include a first storage unit that stores second information (connection setting information) in which IP information (IP address) assigned in advance to the first information processing device in order to identify the first information processing device on a network and first information (for example, identification information or the like) that is different from the IP information and specifies the first information processing device are associated with each other, and a transmitting unit that transmits the second information stored in the first storage unit. The type of information processing device is optional.

(3) Modification 3

Figure 22:
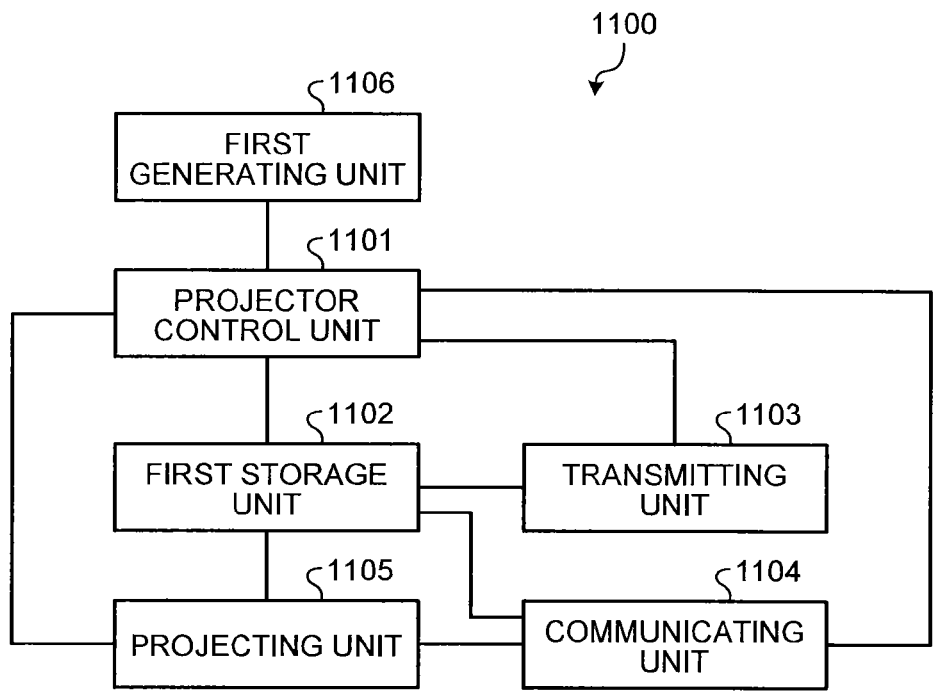
FIG. 22 is a block diagram illustrating a functional configuration example of a projector according to a modification.

FIG. 22 is a block diagram illustrating a functional configuration example of a projector 1100 according to Modification 3. As illustrated in FIG. 22, the projector 1100 is different from the respective embodiments described above in that a first generating unit 1106 is further included. In the following description, the description of the same portions as those of the respective embodiments described above will be omitted appropriately. The first generating unit 1106 has a function of generating identification information based on a MAC address assigned to the communicating unit 1104 and storing the generated identification information in the first storage unit 1102 in association with the IP address. According to an example of an identification information generation algorithm, when the identification information is a four-digit number, a remainder (0 to 9999) of the division of the numerical value of the MAC address by 10000 is used as the identification information. However, the algorithm is not limited to this. In the above embodiment, since the MAC address of the communicating unit 1104 is numbered so as to be unique to each individual, it is possible to obtain an effect that the identification information generated from the MAC address is also unique.

(4) Modification 4

Figure 23:
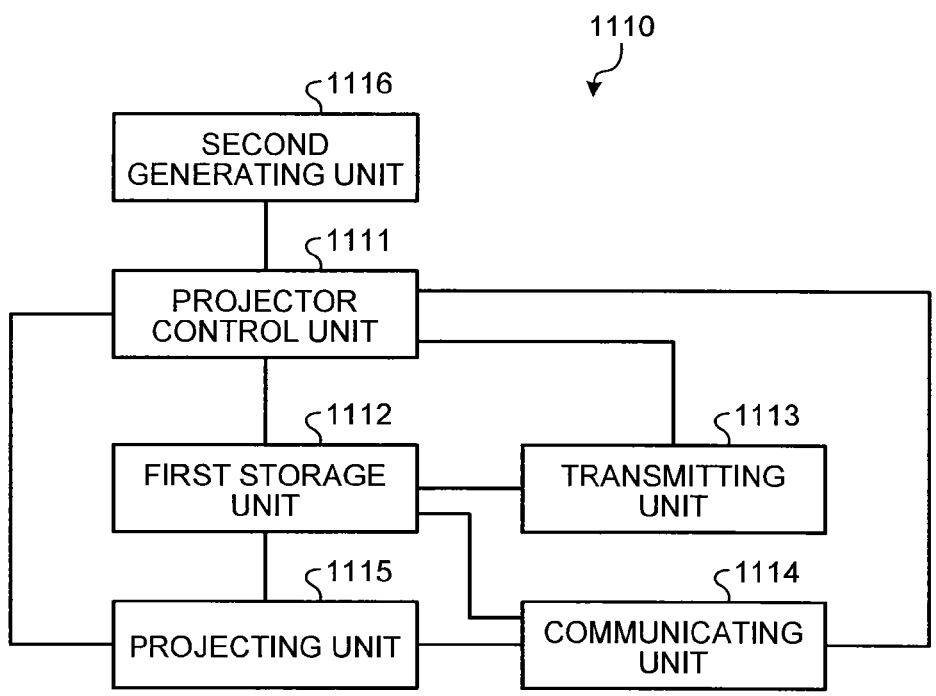
FIG. 23 is a block diagram illustrating a functional configuration example of a projector according to a modification.
Figure 24:
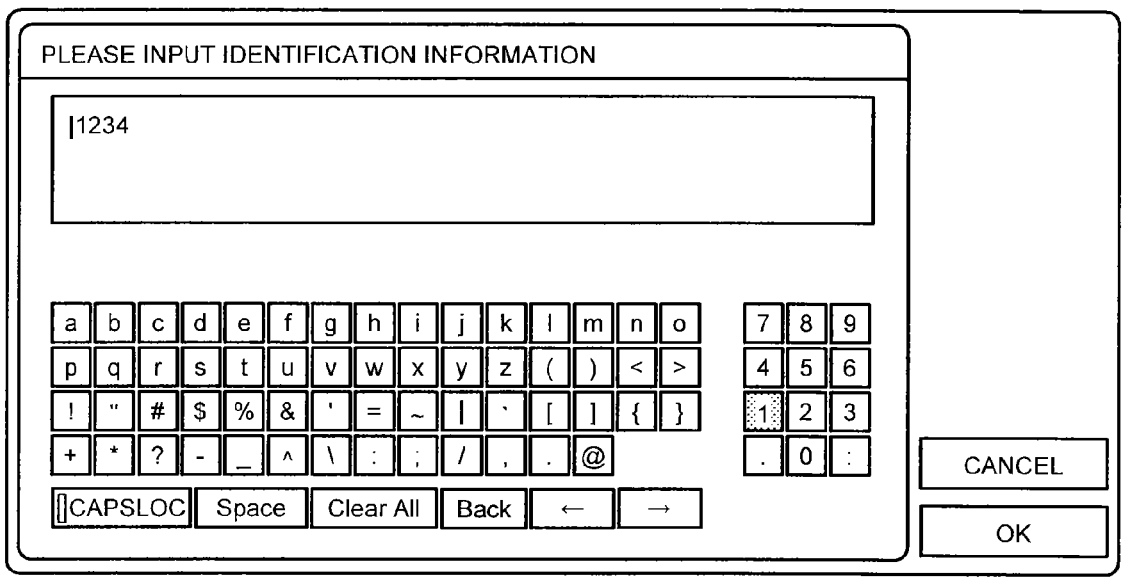
FIG. 24 is a diagram illustrating an example of an operation screen of the projector.

FIG. 23 is a block diagram illustrating a functional configuration example of a projector 1110 according to Modification 4. As illustrated in FIG. 23, the projector 1110 is different from the respective embodiments described above in that a second generating unit 1116 is further included. In the following description, the description of the same portions as those of the respective embodiments described above will be omitted appropriately. The second generating unit 1116 has a function of generating (and modifying) the identification information according to the user's input and storing the generated identification information in a first storage unit 1112 in association with the IP address. For example, the second generating unit 1116 can read present identification information from the first storage unit 1112 and present the identification information (that is, display the same on the operation screen of the projector 1110) so that the user can partially modify the identification information or erase the entirety to input a necessary number of digits. When the characters (for example, numbers or the like) input by the user are insufficient in the number of digits as compared to that defined by the system, the characters are not accepted as the identification information, and an error message such as "Identification information is a four-digit number" may be displayed on the operation screen. When the number of digits is correct, the character string input from the user may be stored in the first storage unit 1112 as new identification information. FIG. 24 is a diagram illustrating an example of an operation screen (UI) of the projector 1110 when the user sets identification information. According to the above embodiment, since the user can use desired identification information, the user can make the identification information of the projector to be used unique or easily recognizable and group a plurality of projectors by the same identification information.

(5) Modification 5

Figure 25:
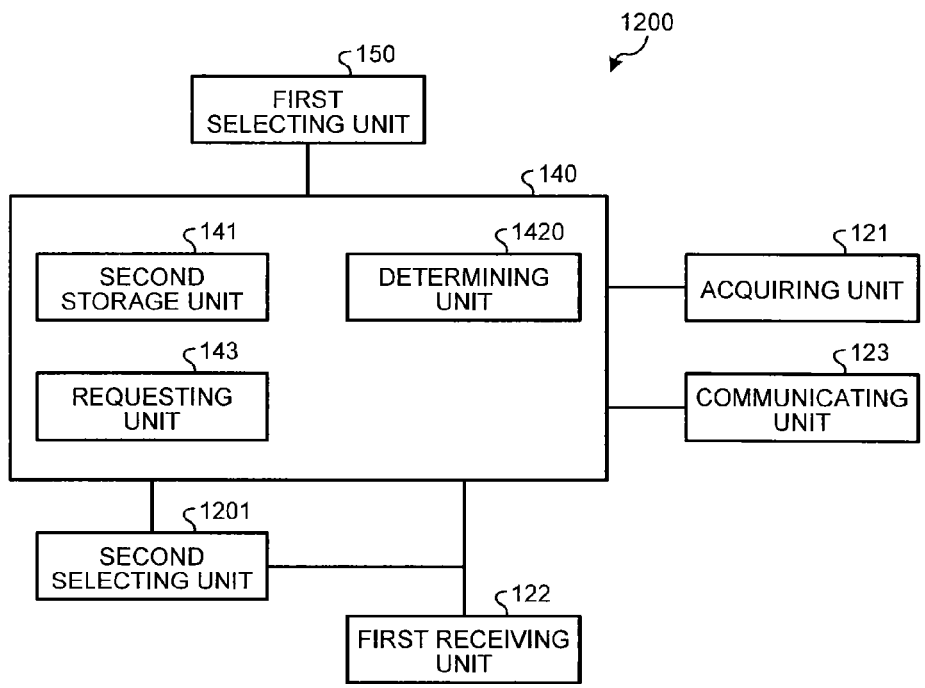
FIG. 25 is a block diagram illustrating a functional configuration example of an information processing terminal according to a modification.

FIG. 25 is a block diagram illustrating a functional configuration example of an information processing terminal 1200 according to Modification 5. As illustrated in FIG. 25, the information processing terminal 1200 is different from the second embodiment in that a second selecting unit 1201 is further included. In the following description, the description of the same portions as those of the second embodiment described above will be omitted appropriately. The second selecting unit 1201 has a function of selecting any one of the identification information and the name information according to the input from the user as a target for comparison with the input character string. Moreover, a determining unit 1420 compares any one of the identification information and the name information included in the connection setting information and selected by the second selecting unit 1201 with the input character string for each of the pieces of connection setting information stored in the second storage unit 141 and determines the projector 110 identified by IP address included in any one of the pieces of connection setting information that include information corresponding to the input character string as the projector 110 to execute projection. The "information corresponding to the input character string" may indicate information that is exactly identical to the input character string and may indicate information that is partially identical to the input character string. In this example, the determining unit 1420 compares any one of the identification information and the name information included in the connection setting information and selected by the second selecting unit 1201 with the input character string for each of the pieces of connection setting information stored in the second storage unit 141 and determines the projector 110 identified by IP address included in any one of the pieces of connection setting information that include the information exactly identical to the input character string as the projector 110 to execute projection.

Figure 26:
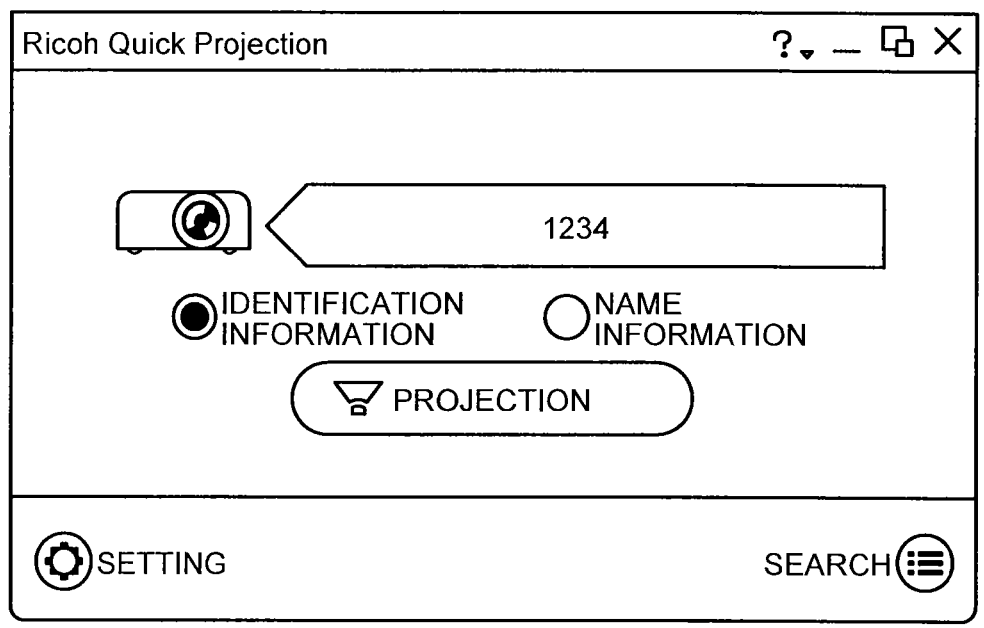
FIG. 26 is a diagram illustrating an example of an operation screen of the information processing terminal.

Next, an operation example of the information processing terminal 1200 when the user designates one of the identification information and the name information projected on the projection surface of the projector 110 to be input, inputs a character string that constitutes the designated information, and inputs a projection instruction will be described. FIG. 26 is a diagram illustrating an example of an operation screen (UI) of the information processing terminal 1200. In this example, the user designates the input of identification information, inputs a character string "1234" that constitutes the identification information projected on the projection surface of any one of the projectors 110, and clicks on an icon for inputting a projection instruction. Upon receiving the input from the user which indicates that the input of the identification information is designated, the first receiving unit 122 notifies the second selecting unit 1201 of the input information indicating the received input. The second selecting unit 1201 selects the identification information according to the input information (that is, according to the user's input) notified from the first receiving unit 122.

Figure 27:
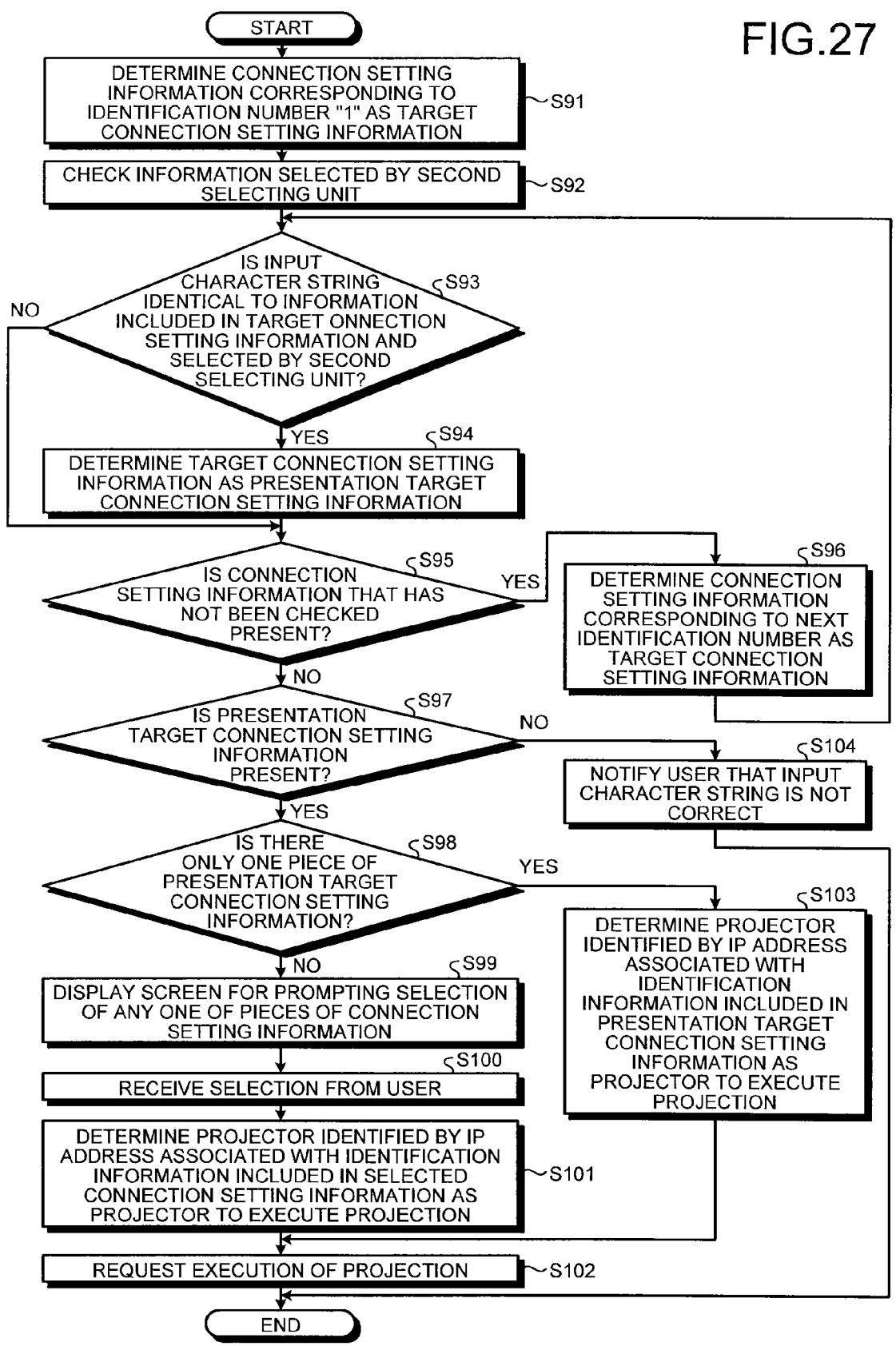
FIG. 27 is a flowchart illustrating an operation example of an information processing terminal according to a modification.

FIG. 27 is a flowchart illustrating an operation example of the information processing terminal 1200 when the user designates the input of identification information, inputs a character string "1234" that constitutes the identification information of any of the projectors 110, and inputs a projection instruction.

As illustrated in FIG. 27, first, the determining unit 1420 determines connection setting information corresponding to an identification number "1" among the plurality of pieces of connection setting information stored in the second storage unit 141 as target information (step S91). Subsequently, the determining unit 1420 inquires of the second selecting unit 1201 which one of the identification information and the name information is selected as a target for comparison with the input character string and checks the information selected by the second selecting unit 1201 (step S92). In this example, the determining unit 1420 confirms that the identification information is selected as a target for comparison with the input character string. Moreover, the determining unit 1420 determines whether the input character string is identical to the information (in this example, the identification information) included in the target connection setting information and selected by the second selecting unit 1201 (step S93). The subsequent processes are the same as the processes of FIG. 20, and detailed description thereof will not be provided.

According to the above modification, the user can designate a projector to execute projection by designating the input of name information and inputting a character string that constitutes the name information. Although it is simple to input the identification information, it is difficult to express a meaning with the identification information itself. On the other hand, since the name information representing the name of the projector is expressed by alphabetic letters or the like (for example, "conference_room" or the like), the name information can easily express a meaning and the user can easily input the name information.

The above modification can be also applied to the first embodiment described above.

(6) Modification 6

Figure 28:
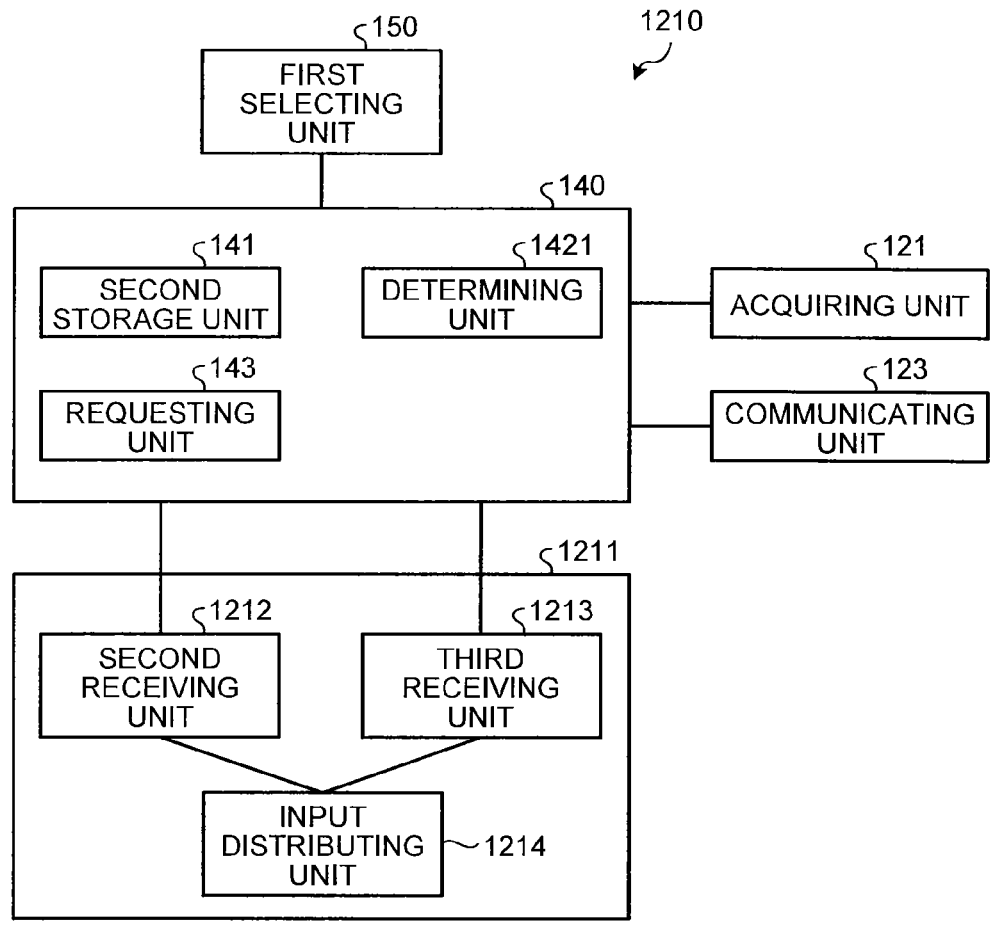
FIG. 28 is a block diagram illustrating a functional configuration example of an information processing terminal according to a modification.

FIG. 28 is a block diagram illustrating a functional configuration example of an information processing terminal 1210 according to Modification 6. As illustrated in FIG. 28, the information processing terminal 1210 is different from that of the second embodiment in that a first receiving unit 1211 includes a second receiving unit 1212 for receiving the input of identification information, a third receiving unit 1213 for receiving the input of name information, and an input distributing unit 1214. In the following description, the description of the same portions as those of the second embodiment described above will be omitted appropriately.

Figure 29:
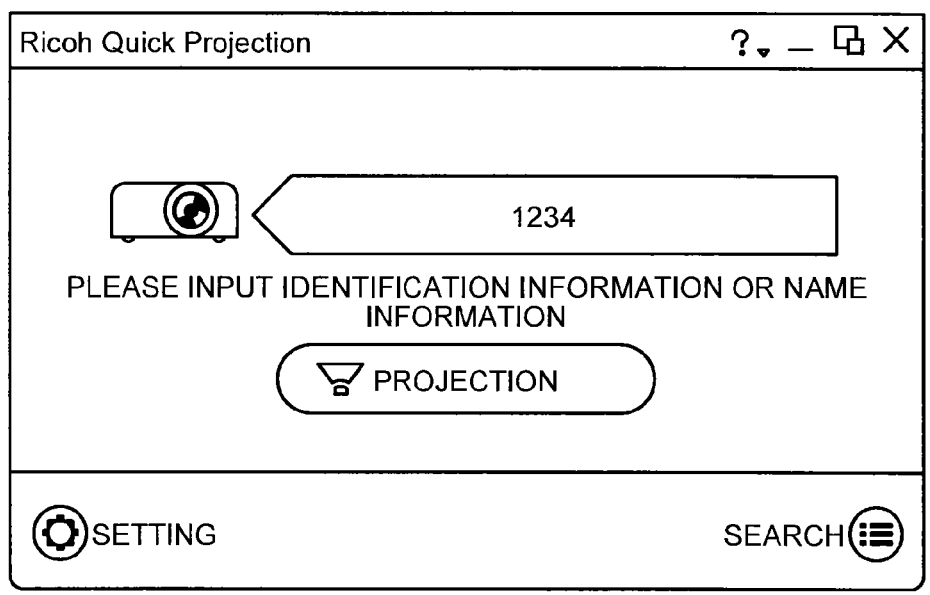
FIG. 29 is a diagram illustrating an example of an operation screen of the information processing terminal.

The input distributing unit 1214 has a function of distributing the input character string to the second receiving unit 1212 and the third receiving unit 1213. The determining unit 1421 has a function of comparing the identification information and the name information included in the connection setting information with the input character strings received by the second receiving unit 1212 and the third receiving unit 1213, respectively, for each of the pieces of connection setting information stored in the second storage unit 141 and determining the projector 110 identified by IP address included in any one of the pieces of connection setting information that include the identification information or the name information corresponding to the input character string as the projector 110 to execute projection. The "identification information or name information corresponding to the input character string" may indicate identification information or name information that is exactly identical to the input character string and may indicate identification information or name information that is partially identical to the input character string. In this example, the determining unit 1421 has a function of comparing the identification information and the name information included in the connection setting information with the input character strings received by the second receiving unit 1212 and the third receiving unit 1213, respectively, for each of the pieces of connection setting information stored in the second storage unit 141 and determining the projector 110 identified by IP address included in any one of the pieces of connection setting information that include the identification information or the name information that is exactly identical to the input character string as the projector 110 to execute projection. FIG. 29 is a diagram illustrating an example of an operation screen (UI) of the information processing terminal 1210. In this example, it is possible to obtain an advantage that the user does not need to designate one of the identification information and the name information to be input when designating the projector 110 to execute projection and can designate the projector by inputting any one of both pieces of information.

The above modification can be also applied to the first embodiment described above.

(7) Modification 7

Figure 30:
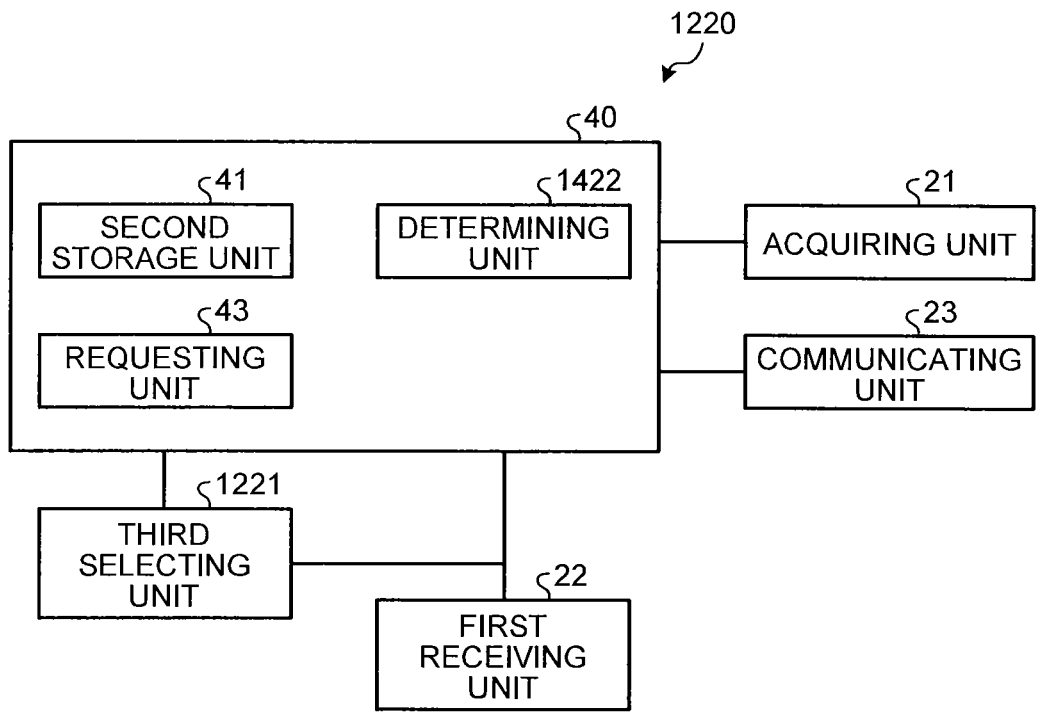
FIG. 30 is a block diagram illustrating a functional configuration example of an information processing terminal according to a modification.

FIG. 30 is a block diagram illustrating a functional configuration example of an information processing terminal 1220 according to Modification 7. As illustrated in FIG. 30, the information processing terminal 1220 is different from that of the first embodiment in that a third selecting unit 1221 is further included. In the following description, the description of the same portions as those of the first embodiment described above will be omitted appropriately. The third selecting unit 1221 has a function of selecting one of the identification information and the IP address according to the input from the user as a target for comparison with the input character string. Moreover, the determining unit 1422 has a function of comparing any one of the identification information and the IP address included in the connection setting information and selected by the third selecting unit 1221 with the input character string for each of the pieces of connection setting information stored in the second storage unit 41 and determining the projector 10 identified by the IP address included in any one of the pieces of connection setting information that include the information corresponding to the input character string as the projector 10 to execute projection. The "information corresponding to the input character string" may indicate information that is exactly identical to the input character string and may indicate information that is partially identical to the input character string. In this example, the determining unit 1422 has a function of comparing any one of the identification information and the IP address included in the connection setting information and selected by the third selecting unit 1221 with the input character string for each of the pieces of connection setting information stored in the second storage unit 41 and determining the projector 10 identified by the IP address included in any one of the pieces of connection setting information that include the information exactly identical to the input character string as the projector 10 to execute projection.

Figure 31:
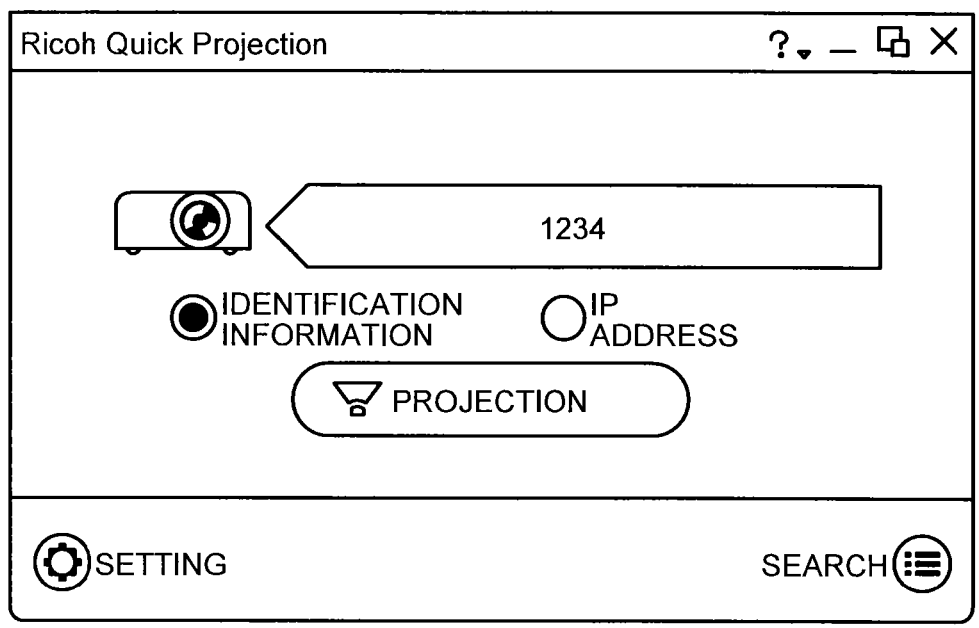
FIG. 31 is a diagram illustrating an example of an operation screen of the information processing terminal.

FIG. 31 is a diagram illustrating an example of an operation screen (UI) of the information processing terminal 1220. In this example, the user designates the input of the identification information, inputs a character string "1234" that constitutes the identification information projected on the projection surface of the projectors 10, and clicks on an icon for inputting a projection instruction. Upon receiving the input from the user which indicates that the input of the identification information is designated, the first receiving unit 22 notifies the third selecting unit 1221 of the input information indicating the received input. The third selecting unit 1221 selects the identification information according to the input information (that is, according to the user's input) notified from the first receiving unit 22. The third selecting unit 1221 also has a function of notifying the determining unit 1422 of which one of the identification information and the IP address has been selected according to the inquiry from the determining unit 1422.

According to the above modification, the user can designate the projector 10 to execute projection by designating the input of the IP address and inputting a character string that constitutes the IP address. That is, the IP address which is most common means for designating a device connected to a network can be used for designating a projector. In this case, the projector 10 can also project the IP address included in the connection setting information stored in the first storage unit 12 on the projection surface of the projector 10. The above modification can be also applied to the second embodiment described above.

That is, the information processing terminal ("second information processing device" of the claims) used by the user may include: an acquiring unit that acquires second information (for example, the connection setting information) in which IP information (IP address) of a first information processing device (for example, a projector) connected to the information processing terminal and first information (for example, identification information) for specifying the first information processing device are associated with each other; a second storage unit that stores the second information acquired by the acquiring unit; a first receiving unit that receives an input character string indicating a character string input by the user; and a determining unit that determines the first information processing device identified by the IP information included in the second information that includes the first information corresponding to the input character string among at least one piece of second information stored in the second storage unit as the first information processing device to execute a process requested from the user.

(8) Modification 8

Figure 32:
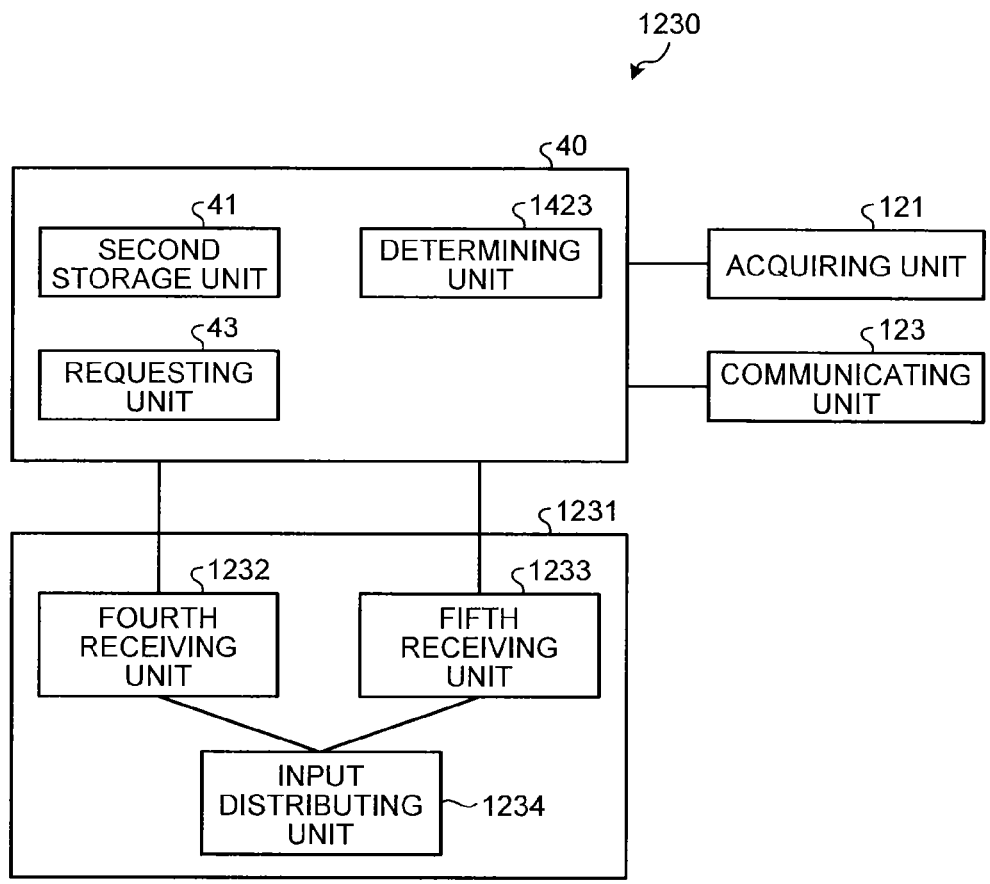
FIG. 32 is a block diagram illustrating a functional configuration example of an information processing terminal according to a modification.

FIG. 32 is a block diagram illustrating a functional configuration example of an information processing terminal 1230 according to Modification 8. As illustrated in FIG. 32, the information processing terminal 1230 is different from that of the first embodiment in that a first receiving unit 1231 includes a fourth receiving unit 1232 for receiving the input of an IP address, a fifth receiving unit 1233 for receiving the input of identification information, and an input distributing unit 1234. In the following description, the description of the same portions as those of the first embodiment described above will be omitted appropriately.

Figure 33:
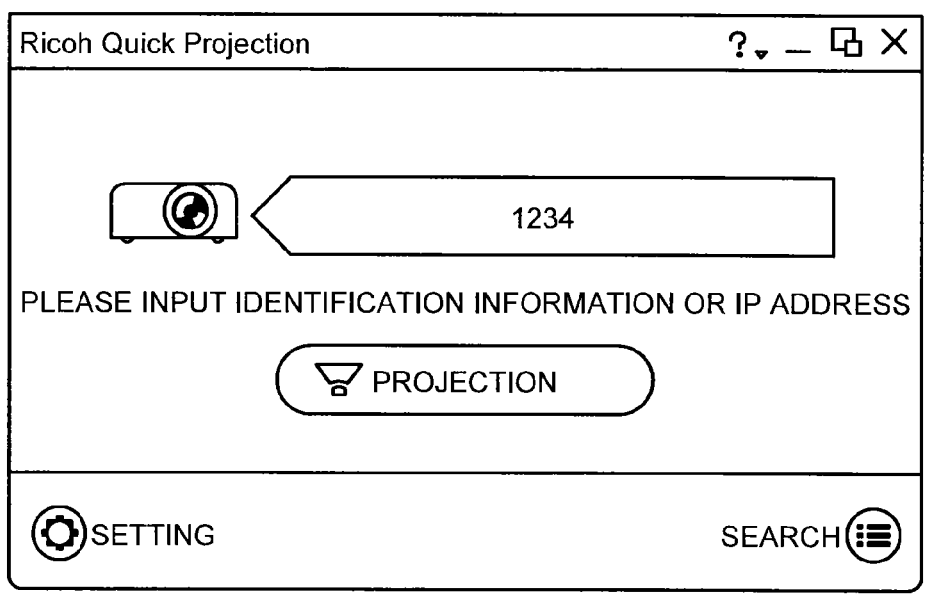
FIG. 33 is a diagram illustrating an example of an operation screen of the information processing terminal.

The input distributing unit 1234 has a function of distributing the input character string to the fourth receiving unit 1232 and the fifth receiving unit 1233. The determining unit 1423 has a function of comparing the identification information included in the connection setting information with the input character strings received by the fourth receiving unit 1232 and the fifth receiving unit 1233 for each of the pieces of connection setting information stored in the second storage unit 41 and determining the projector 10 identified by the IP address included in any one of the pieces of connection setting information that include the identification information or the IP address corresponding to the input character string as the projector 10 to execute projection. The "identification information or IP address information corresponding to the input character string" may indicate identification information or IP address information that is exactly identical to the input character string and may indicate identification information or IP address information that is partially identical to the input character string. In this example, the determining unit 1423 has a function of comparing the identification information included in the connection setting information with the input character strings received by the fourth receiving unit 1232 and the fifth receiving unit 1233 for each of the pieces of connection setting information stored in the second storage unit 41 and determining the projector 10 identified by the IP address included in any one of the pieces of connection setting information that include the identification information or the IP address that is exactly identical to the input character string as the projector 10 to execute projection. FIG. 33 is a diagram illustrating an example of an operation screen (UI) of the information processing terminal 1230. In this example, it is possible to obtain an advantage that the user does not need to designate one of the identification information and the IP address when designating the projector 10 to execute projection and can designate the projector 10 by inputting any one of both pieces of information. The above modification can be also applied to the second embodiment described above.

That is, the information processing terminal ("second information processing device" of the claims) used by the user may include: an acquiring unit that acquires second information (for example, the connection setting information) in which IP information (IP address) of a first information processing device (for example, a projector) connected to the information processing terminal and first information (for example, identification information) for specifying the first information processing device are associated with each other; a second storage unit that stores the second information acquired by the acquiring unit; a first receiving unit that receives an input character string indicating a character string input by the user; and a determining unit that determines the first information processing device identified by the IP information included in the second information that includes the first information corresponding to the input character string among at least one piece of second information stored in the second storage unit as the first information processing device to execute a process requested from the user.

(9) Modification 9

Figure 34:
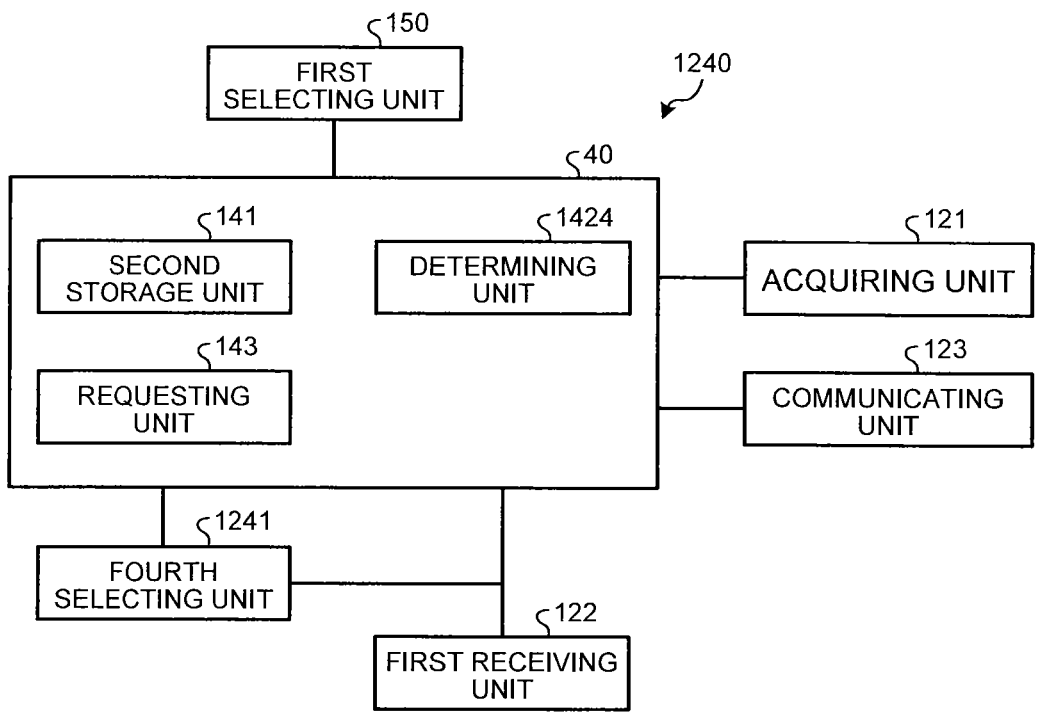
FIG. 34 is a block diagram illustrating a functional configuration example of an information processing terminal according to a modification.

FIG. 34 is a block diagram illustrating a functional configuration example of an information processing terminal 1240 according to Modification 9. As illustrated in FIG. 34, the information processing terminal 1240 is different from that of the second embodiment in that it further includes a fourth selecting unit 1241. In the following description, the description of the same portions as those of the second embodiment described above will be omitted appropriately. The fourth selecting unit 1241 has a function of selecting one of the identification information, the name information, and the IP address according to input from the user as a target for comparison with the input character string. Moreover, the determining unit 1422 has a function of comparing any one of the identification information, the name information, and the IP address included in the connection setting information and selected by the fourth selecting unit 1241 with the input character string for each of the pieces of connection setting information stored in the second storage unit 141 and determining the projector 110 identified by the IP address included in any one of the pieces of connection setting information that include the information corresponding to the input character string as the projector 110 to execute projection. The "information corresponding to the input character string" may indicate information that is exactly identical to the input character string and may indicate information that is partially identical to the input character string. In this example, the determining unit 1422 has a function of comparing any one of the identification information, the name information, and the IP address included in the connection setting information and selected by the fourth selecting unit 1241 with the input character string for each of the pieces of connection setting information stored in the second storage unit 141 and determining the projector 110 identified by the IP address included in any one of the pieces of connection setting information that include the information exactly identical to the input character string as the projector 110 to execute projection.

Figure 35:
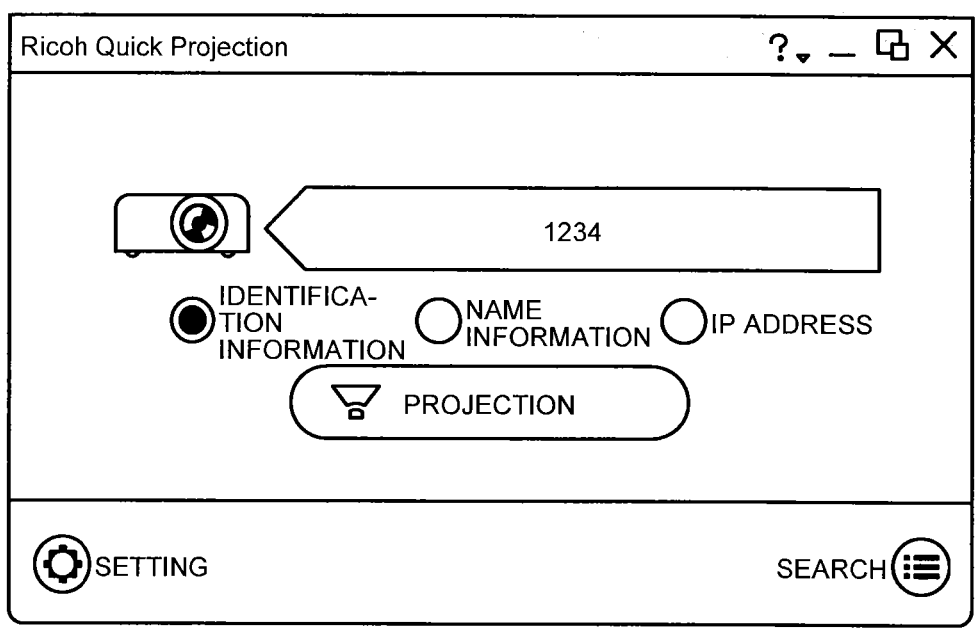
FIG. 35 is a diagram illustrating an example of an operation screen of the information processing terminal.

FIG. 35 is a diagram illustrating an example of an operation screen (UI) of the information processing terminal 1240. In this example, the user designates the identification information, inputs a character string "1234" that constitutes the identification information projected on the projection surface of the projector 110, and clicks on an icon for inputting a projection instruction. Upon receiving the input from the user indicating that the identification information is designated, the first receiving unit 122 notifies the fourth selecting unit 1241 of the input information indicating the received input. The fourth selecting unit 1241 selects the identification information according to the input information (that is, according to the user's input) notified from the first receiving unit 122. The fourth selecting unit 1241 also has a function of notifying the determining unit 1424 of which one of the identification information, the name information, and the IP address has been selected according to the inquiry from the determining unit 1424.

According to the above modification, the user can designate the projector 10 to execute projection by designating the input of any one of the identification information, the name information, and the IP address and inputting a character string that constitutes the designated information.

The above modification can also be applied to the first embodiment described above.

(10) Modification 10

Figure 36:
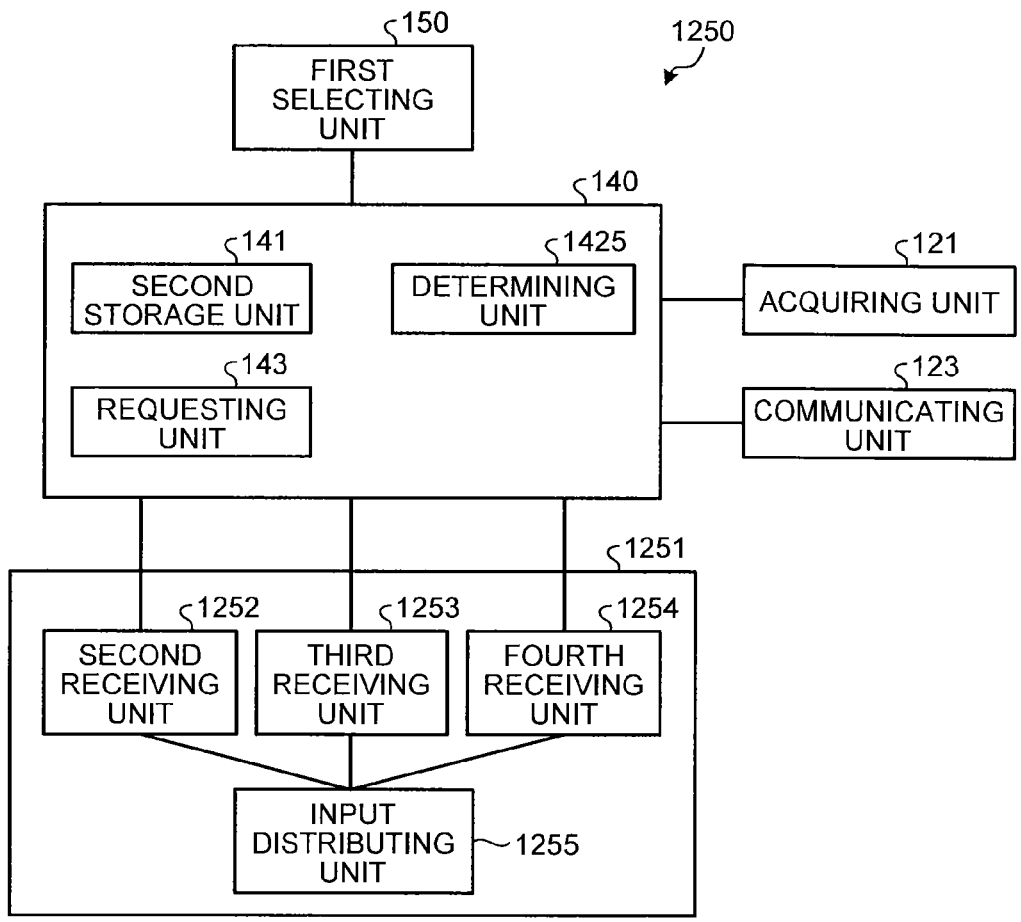
FIG. 36 is a block diagram illustrating a functional configuration example of an information processing terminal according to a modification.

FIG. 36 is a block diagram illustrating a functional configuration example of an information processing terminal 1250 according to Modification 10. As illustrated in FIG. 36, the information processing terminal 1250 is different from that of the first embodiment in that a first receiving unit 1251 includes a second receiving unit 1252 for receiving the input of identification information, a third receiving unit 1253 for receiving the input of name information, a fourth receiving unit 1254 for receiving the input of an IP address, and an input distributing unit 1255. In the following description, the description of the same portions as those of the first embodiment described above will be omitted appropriately.

Figure 37:
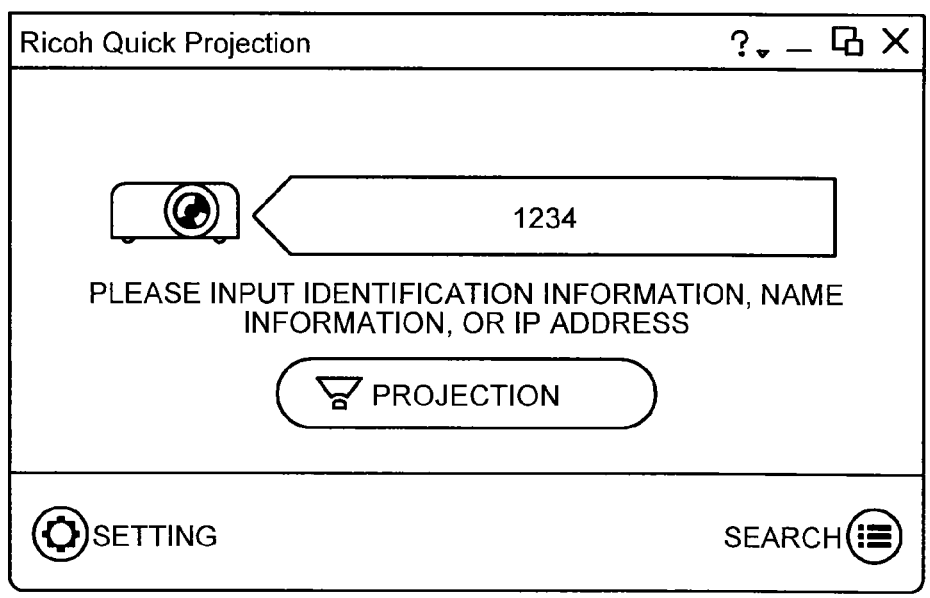
FIG. 37 is a diagram illustrating an example of an operation screen of the information processing terminal.

The input distributing unit 1255 has a function of distributing the input character string to the second receiving unit 1252, the third receiving unit 1253, and the fourth receiving unit 1254. The determining unit 1425 has a function of comparing the identification information, the name information, and the IP address included in the connection setting information with the input character strings received by the second receiving unit 1252, the third receiving unit 1253, and the fourth receiving unit 1254 for each of the pieces of connection setting information stored in the second storage unit 141 and determining the projector 110 identified by the IP address included in any one of the pieces of connection setting information that include information (any one of the identification information, the name information, and the IP address) corresponding to the input character string as the projector 110 to execute projection. The "information (any one of identification information, name information, and IP address) corresponding to the input character string" may indicate information that is exactly identical to the input character string and may indicate information that is partially identical to the input character string. In this example, the determining unit 1425 has a function of comparing the identification information, the name information, and the IP address included in the connection setting information with the input character strings received by the second receiving unit 1252, the third receiving unit 1253, and the fourth receiving unit 1254 for each of the pieces of connection setting information stored in the second storage unit 141 and determining the projector 110 identified by the IP address included in any one of the pieces of connection setting information that include the information (any one of the identification information, the name information, and the IP address) that is exactly identical to the input character string as the projector 110 to execute projection. FIG. 37 is a diagram illustrating an example of an operation screen (UI) of the information processing terminal 1250. In this example, it is possible to obtain an advantage that the user does not need to designate one of the identification information, the name information, and the IP address to be input when designating the projector 110 to execute projection and can designate the projector 110 by inputting any one of these pieces of information.

The above modification can be also applied to the second embodiment described above.

The program executed by the projector and the information processing terminal may be configured to be provided by being recorded in a computer readable recording medium such as a CD-ROM, a flexible disk (FD), a CD-R, or a digital versatile disk (DVD) as a file of an installable format or an executable format.

Further, the program executed by the projector and the information processing terminal may be configured to be provided by being stored on a computer connected to a network such as the Internet and downloaded via the network. Moreover, the program executed by the projector and the information processing terminal may be configured to be provided or distributed via a network such as the Internet.

According to the embodiment, it is possible to obtain an advantageous effect that users can easily designate an information processing device to execute a requested process.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system, comprising:
at least one first information processing device; and
a second information processing device connectable to the at least one first information processing device, wherein
each first information processing device of the at least one first information processing device includes:
a first memory that stores second information in which IP information assigned in advance to the first information processing device in order to identify the first information processing device on a network, and first information that is different from the IP information and specifies the first information processing device, are associated with each other; and
a transmitter that transmits, over the network, the second information stored in the first memory to the second information processing device,
the second information processing device includes:
an acquiring unit that acquires the second information;
a second memory that stores at least one piece of the second information acquired by the acquiring unit;
a first receiver that receives an input character string indicating a character string input by a user; and
a determining unit that determines a first information processing device identified by IP information included in second information that includes first information corresponding to the input character string among the at least one piece of the second information stored in the second memory as the first information processing device to execute a process requested from the user,
wherein the second information processing device further includes a first selecting unit that, when a plurality of pieces of second information that include the first information or the IP information corresponding to the input character string are present, displays a screen to prompt selection of any one of the pieces of the second information and selects second information for which a selection input is entered, and
the determining unit determines a first information processing device identified by IP information included in the second information selected by the first selecting unit as the first information processing device to execute the process requested from the user.

2. The information processing system according to claim 1, wherein
the first information consists of a character string that is shorter than a character string that constitutes the IP information.

3. The information processing system according to claim 1, wherein
the second information processing device includes a requesting unit that requests the first information processing device determined by the determining unit to execute the process requested from the user.

4. The information processing system according to claim 1, wherein each of the at least one first information processing device includes:
a communicating unit that communicates with the second information processing device via the network; and
a first generating unit that generates the first information based on a MAC address assigned to the communicating unit and stores the generated first information in the first memory in association with the IP information.

5. The information processing system according to claim 1, wherein each of the at least one first information processing device includes:
   a second generating unit that generates the first information according to an input from the user and stores the generated first information in the first memory in association with the IP information.

6. The information processing system according to claim 1, wherein
   the first information is identification information indicating a character string that is shorter than a character string that constitutes the IP information or name information indicating a name of the second information processing device,
   the second information is information in which the identification information, the name information, and the IP information are associated with one another,
   the second information processing device includes a second selecting unit that selects any one of the identification information and the name information according to input from the user as a target for comparison with the input character string, and
   the determining unit compares any one of the identification information and the name information included in second information and selected by the second selecting unit with the input character string for each of at least one piece of the second information stored in the second memory and determines a first information processing device identified by IP information included in any one of pieces of second information that includes information corresponding to the input character string as the first information processing device to execute the process requested from the user.

7. The information processing system according to claim 1, wherein
   the first information is identification information indicating a character string that is shorter than a character string that constitutes the IP information or name information indicating a name of the second information processing device,
   the second information is information in which the identification information, the name information, and the IP information are associated with one another,
   the first receiver includes:
      a second receiver that receives input of the identification information;
      a third receiver that receives input of the name information; and
      an input distributing unit that distributes the input character string to the second receiving unit and the third receiving unit, and
   the determining unit compares the input character string received by the second receiving unit and the third receiving unit with the identification information and the name information included in the second information for each of at least one piece of the second information stored in the second memory, and determines a first information processing device identified by IP information included in any one of pieces of second information that include the identification information or the name information corresponding to the input character string as the first information processing device to execute the process requested from the user.

8. The information processing system according to claim 1, wherein
   the second information processing device includes a third selecting unit that selects any one of the first information and the IP information according to input from the user as a target for comparison with the input character string, and
   the determining unit compares any one of the first information and the IP information included in the second information and selected by the third selecting unit with the input character string for each of at least one piece of the second information stored in the second memory, and determines a first information processing device identified by IP information included in any one of pieces of second information that includes the information corresponding to the input character string as the first information processing device to execute the process requested from the user.

9. The information processing system according to claim 1, wherein
   the first receiver includes:
      a fourth receiver that receives input of the IP information;
      a fifth receiver that receives the input of the first information; and
      an input distributing unit that distributes the input character string to the fourth receiver and the fifth receiver, and
   the determining unit compares the input character string received by the fourth receiver and the fifth receiver with the first information and the IP information included in second information for each of at least one piece of the second information stored in the second memory, and determines a first information processing device identified by the IP information included in any one of pieces of second information that includes the first information or the IP information corresponding to the input character string as the first information processing device to execute the process requested from the user.

10. The information processing system according to claim 1, wherein
    the first information is identification information indicating a character string that is shorter than a character string that constitutes the IP information or name information indicating a name of the second information processing device,
    the second information is information in which the identification information, the name information, and the IP information are associated with each other,
    the second information processing device includes a fourth selecting unit that selects any one of the identification information, the name information, and the IP information according to input from the user as a target for comparison with the input character string, and
    the determining unit compares any one of the identification information, the name information, and the IP information included in second information and selected by the fourth selecting unit with the input character string for each of at least one piece of the second information stored in the second memory, and determines a first information processing device identified by IP information included in any one of pieces of second information that includes information corresponding to the input character string as the first information processing device to execute the process requested from the user.

11. The information processing system according to claim 1, wherein
    the first information is identification information indicating a character string that is shorter than a character string that constitutes the IP information or name information indicating a name of the second information processing device, the second information is information in which the identification information, the name information, and the IP information are associated with each other, the first receiver includes:
- a second receiver that receives input of the identification information;
- a third receiver that receives input of the name information;
- a fourth receiver that receives input of the IP information; and
- an input distributing unit that distributes input from the user to the second receiver, the third receiver, and the fourth receiver, and the determining unit compares the identification information, the name information, and the IP information included in second information with the input character string received by the second receiver, the third receiver, and the fourth receiver for each of at least one piece of the second information stored in the second memory, and determines a first information processing device identified by IP information included in any one of pieces of second information that includes the information corresponding to the input character string as the first information processing device to execute the process requested from the user.

12. The information processing system of claim 1, wherein each first information processing device includes a projecting unit that projects the first information stored in the first memory, before the transmitter transmits the second information stored in the first memory to the second information processing device.

13. An information processing device connectable to at least one external information processing device, the information processing device comprising:
- an acquiring unit that receives, from an external information processing device over a network, second information in which IP information assigned in advance to the external information processing device in order to identify the external information processing device on the network and first information that is different from the IP information and specifies the external information processing device are associated with each other;
- a memory that stores the second information acquired by the acquiring unit;
- a receiver that receives an input character string indicating a character string input by a user; and
- a determining unit that determines an external information processing device identified by IP information included in second information that includes first information corresponding to the input character string among at least one piece of the second information stored in the memory as an external information processing device to execute a process requested from the user, wherein the information processing device further includes a first selecting unit that, when a plurality of pieces of second information that include the first information or the IP information corresponding to the input character string are present, displays a screen to prompt selection of any one of the pieces of the second information and selects second information for which a selection input is entered, and the determining unit determines an external information processing device identified by IP information included in the second information selected by the first selecting unit as the external information processing device to execute the process requested from the user.

14. An information processing device connectable to an information processing terminal used by a user, the information processing device comprising:
- a first memory that stores second information in which IP information assigned in advance to the information processing device in order to identify the information processing device on a network, and first information that is different from the IP information and specifies the information processing device are associated with each other; and
- a transmission control unit that performs control of transmitting, over the network, the second information stored in the first memory to the information processing terminal, the information processing terminal including:
- an acquiring unit that acquires the second information;
- a second memory that stores the second information acquired by the acquiring unit;
- a first receiver that receives an input character string indicating a character string input by the user; and
- a determining unit that determines an information processing device identified by IP information included in second information that includes first information corresponding to the input character string among at least one piece of the second information stored in the second memory as an information processing device to execute a process requested from the user, wherein the information processing device further includes a first selecting unit that, when a plurality of pieces of second information that include the first information or the IP information corresponding to the input character string are present, displays a screen to prompt selection of any one of the pieces of the second information and selects second information for which a selection input is entered, and the determining unit determines an information processing device identified by IP information included in the second information selected by the first selecting unit as the information processing device to execute the process requested from the user.

* * * * *